United States Patent
Satoh et al.

(10) Patent No.: US 10,031,016 B2
(45) Date of Patent: Jul. 24, 2018

(54) FLUID DETECTION APPARATUS TO DETECT A QUANTITY OF FLUID USING A VIBRATION

(71) Applicants: Kazuho Satoh, Kanagawa (JP); Tomoki Shimohira, Kanagawa (JP); Tetsuhiko Mizuyama, Kanagawa (JP); Tetsuro Hirota, Kanagawa (JP)

(72) Inventors: Kazuho Satoh, Kanagawa (JP); Tomoki Shimohira, Kanagawa (JP); Tetsuhiko Mizuyama, Kanagawa (JP); Tetsuro Hirota, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 49 days.

(21) Appl. No.: 15/254,229

(22) Filed: Sep. 1, 2016

(65) Prior Publication Data
US 2017/0074713 A1  Mar. 16, 2017

(30) Foreign Application Priority Data

Sep. 15, 2015  (JP) ................. 2015-181855

(51) Int. Cl.
*G01F 23/296* (2006.01)
*G03G 15/10* (2006.01)
*G03G 15/08* (2006.01)

(52) U.S. Cl.
CPC ....... *G01F 23/2968* (2013.01); *G03G 15/086* (2013.01); *G03G 15/0858* (2013.01); *G03G 15/105* (2013.01)

(58) Field of Classification Search
CPC ............. G01F 23/2968; G03G 15/086; G03G 15/0858; G03G 15/105
USPC .......................................... 399/57
See application file for complete search history.

(56) References Cited

U.S. PATENT DOCUMENTS

2016/0116860 A1  4/2016  Hirota et al.

FOREIGN PATENT DOCUMENTS

| EP | 3 015 921 A1 | 5/2016 |
|---|---|---|
| JP | 2008-139884 | 6/2008 |
| JP | 2013-037279 | 2/2013 |
| JP | 2013-037280 | 2/2013 |
| JP | 2016-085290 | 5/2016 |
| JP | 2016-085291 | 5/2016 |

OTHER PUBLICATIONS

Extended European Search Report dated Feb. 3, 2017 in Patent Application No. 16188382.2.

*Primary Examiner* — Billy Lactaoen
(74) *Attorney, Agent, or Firm* — Oblon, McClelland, Maier & Neustadt, L.L.P.

(57) ABSTRACT

A fluid detection apparatus to detect quantity of a fluid having flowability and stored in a casing includes an oscillator disposed outside the casing to output a frequency of an oscillation signal corresponding to a magnetic flux passing through a space near the oscillator, a vibrator made of material effecting the magnetic flux and disposed inside the casing, a vibration trigger disposed inside the casing to vibrate the vibrator, and circuitry to acquire frequency-related information related to the frequency of the oscillation signal output from the oscillator, detect the vibration of the vibrator based on a change of the frequency-related information, determine whether the vibration of the vibrator converges during a convergence-checking time period defined after the vibrator is vibrated by the vibration trigger, and detect the quantity of the fluid in the casing based on a convergence determination result of the vibration of the vibrator.

11 Claims, 15 Drawing Sheets

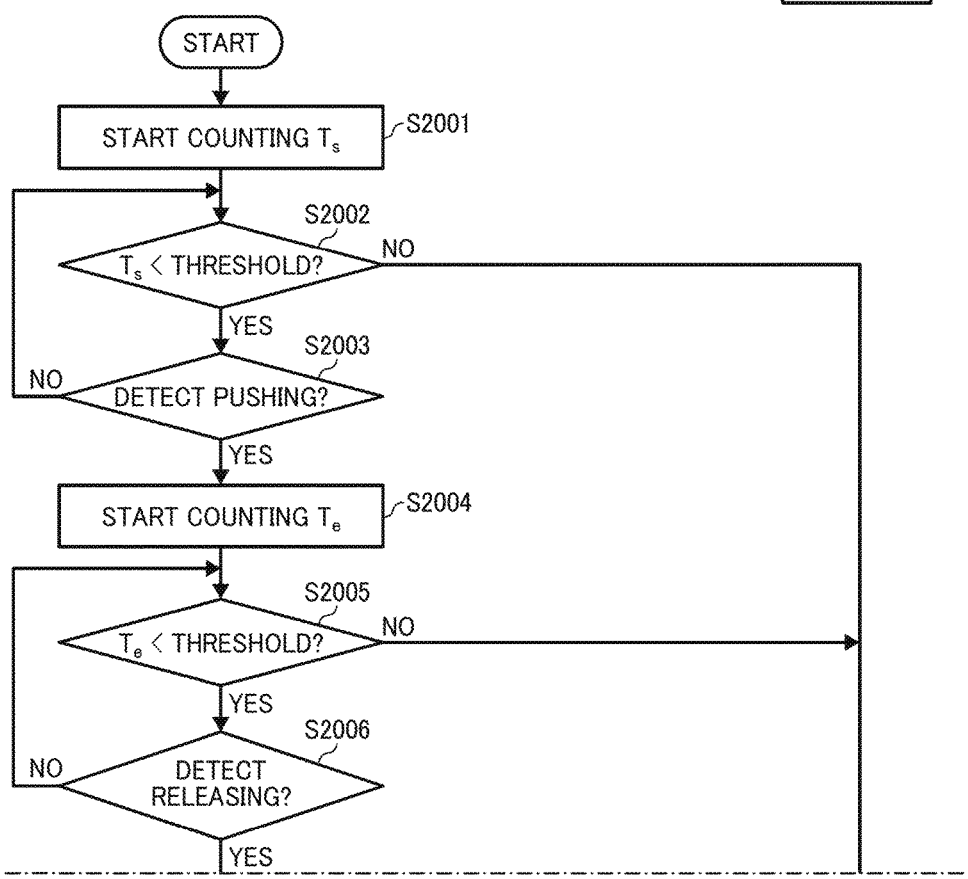

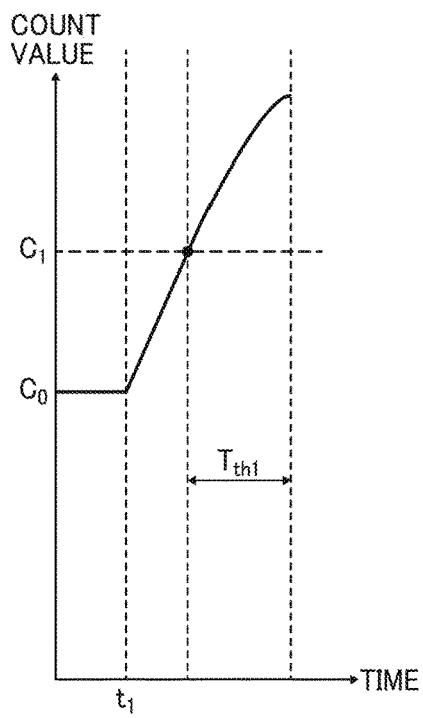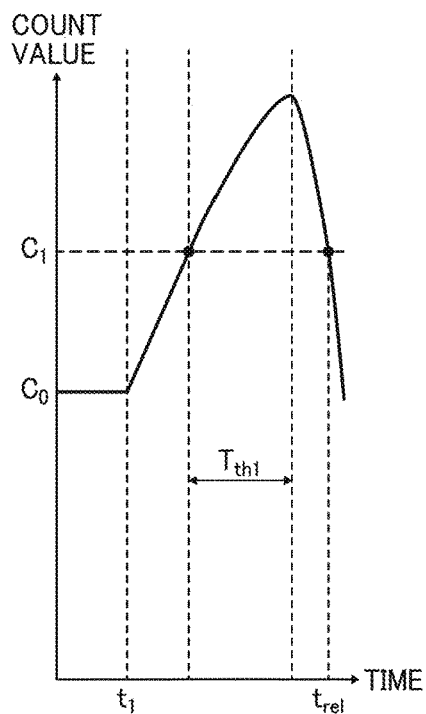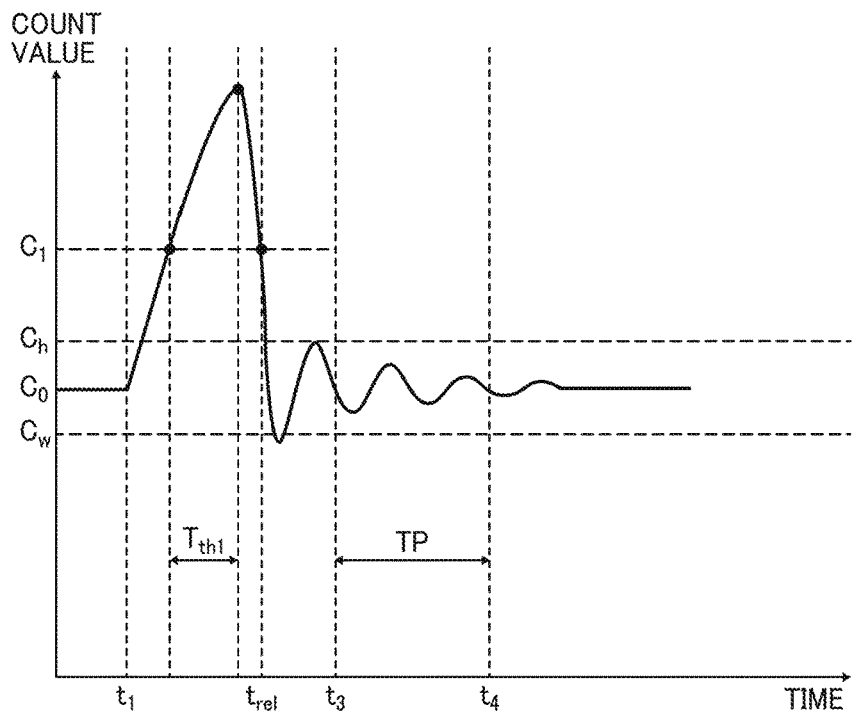

FIG. 24
| NUMBER n | 0 | 1 | 2 | 3 | 4 | 5 | 6 | 7 | 8 | 9 | 10 | 11 | ... |
|---|---|---|---|---|---|---|---|---|---|---|---|---|---|
| COUNT VALUE $S_n$ | 3400 | 3390 | 3360 | 3340 | 3310 | 3300 | 3310 | 3320 | 3350 | 3370 | 3380 | 3370 | ... |
| $S_{n-1} - S_n$ | | − | + | + | + | + | + | − | − | − | − | − | + |
FIG. 25
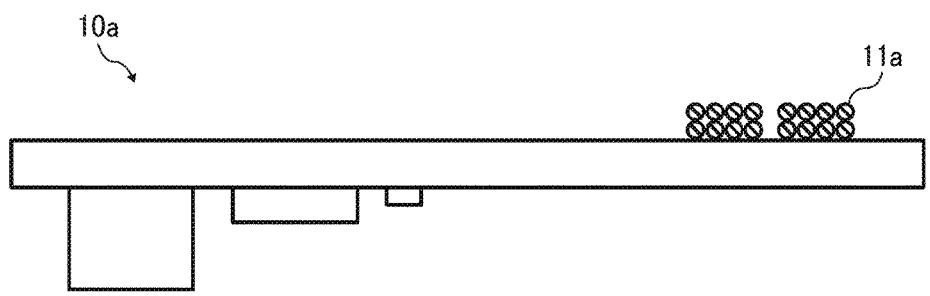
FIG. 26
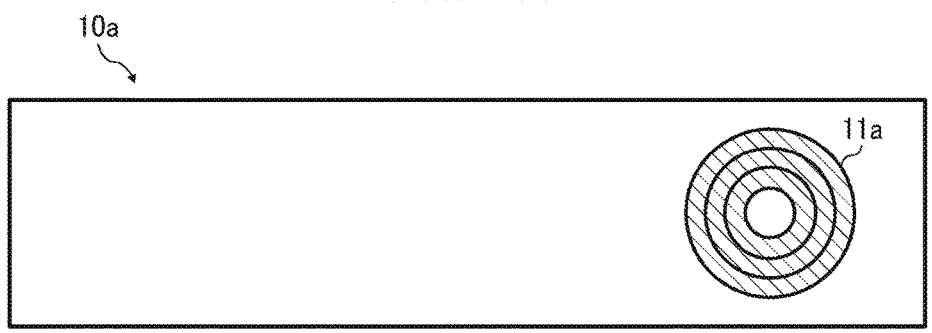

FLUID DETECTION APPARATUS TO DETECT A QUANTITY OF FLUID USING A VIBRATION

CROSS-REFERENCE TO RELATED APPLICATION

This application claims priority pursuant to 35 U.S.C. § 119(a) to Japanese Patent Application No. 2015-181855, filed on Sep. 15, 2015 in the Japan Patent Office, the disclosure of which is incorporated by reference herein in their entirety.

BACKGROUND

Technical Field

This disclosure relates to a fluid detection apparatus, a fluid detection method, and a storage medium.

Background Art

Information digitization using image processing apparatuses has been advanced, in which documents can be digitized by scanners, and digitized information can be output by printers and facsimiles. For example, some image processing apparatuses use electrophotography for an image forming operation, in which an electrostatic latent image formed on a photoconductor is developed by toner, and the developed image is transferred onto a sheet.

When the electrophotography image forming apparatus is employed, the electrostatic latent image formed on the photoconductor is developed by a developing device, in which the developer is supplied to the developing device from a developer container. The residual quantity of the developer in the developer container can be detected using known methods. For example, the residual quantity of the developer can be detected by a sheet that is disposed in the developer container and deformable by an agitator of the developer in the developer container, in which the sheet can be deformed by contacting the agitator, and then the residual quantity of the developer can be detected based on the deformed sheet condition as disclosed in, for example, JP-2013-37280-A.

However, the deformation of sheet may not exactly correspond to the actual residual quantity of the developer in the developer container. Further, the sheet property changes over time, and the developer adheres on the sheet, with which the detection may not be performed with a higher precision.

Instead of the configuration using the sheet, an image forming apparatus can include a vibrator in the developer container, and an oscillator. The vibrator is made of material that effects magnetic flux passing through the vibrator while the vibrator can contact the developer in the developer container, and the oscillator that outputs frequency signals corresponding to the magnetic flux effected by the vibrator, in which the residual quantity of the developer in the developer container can be detected based on the frequency signals. When the residual quantity of the developer in the developer container is greater, the vibration of the vibrator is obstructed, and thereby the vibration of the vibrator converges faster over time, and the frequency signals change faster over time. By contrast, when the developer condition in the developer container becomes a certain condition, different from the full filling of the developer in the developer container, the vibration of the vibrator is obstructed by the developer and the vibrator does not vibrate, and thereby the analysis of the change of the frequency signals over time becomes impossible. If the change of the frequency signals over time cannot be detected, the developer condition in the developer container cannot be detected.

SUMMARY

As one aspect of the present invention, a fluid detection apparatus to detect quantity of a fluid having flowability and stored in a casing is devised. The fluid detection apparatus includes an oscillator disposed outside the casing to output a frequency of an oscillation signal corresponding to a magnetic flux passing through a space near the oscillator, a vibrator made of material effecting the magnetic flux and disposed inside the casing, the vibrator facing the oscillator via a wall of the casing, a vibration trigger disposed inside the casing to vibrate the vibrator, and circuitry to acquire frequency-related information related to the frequency of the oscillation signal output from the oscillator periodically, the frequency-related information changeable depending on a vibration of the vibrator, detect the vibration of the vibrator based on a change of the frequency-related information, determine whether the vibration of the vibrator converges during a convergence-checking time period defined by two time points set after the vibrator is vibrated by the vibration trigger, and detect the quantity of the fluid in the casing based on a convergence determination result of the vibration of the vibrator.

As another aspect of the present invention, a method of detecting quantity of a fluid having flowability in a casing is devised. The method includes acquiring frequency-related information related to a frequency of an oscillation signal output from an oscillator periodically, the frequency of the oscillation signal corresponding to a magnetic flux passing through a space near the oscillator disposed outside the casing, the frequency-related information changeable depending on a vibration of a vibrator by a vibration trigger, the vibrator being made of material effecting the magnetic flux and disposed inside the casing while facing the oscillator via the casing, detecting the vibration of the vibrator based on a change of the frequency-related information, determining whether the vibration of the vibrator converges during a convergence-checking time period defined by two time points set after the vibrator is vibrated by the vibration trigger, and detecting the quantity of the fluid in the casing based on a convergence determination result of the vibration of the vibrator.

As another aspect of the present invention, a non-transitory storage medium storing a program that, when executed by a computer, causes the computer to execute a method of detecting quantity of a fluid having flowability in a casing is devised. The method includes acquiring frequency-related information related to a frequency of an oscillation signal output from an oscillator periodically, the frequency of the oscillation signal corresponding to a magnetic flux passing through a space near the oscillator disposed outside the casing, the frequency-related information changeable depending on a vibration of a vibrator by a vibration trigger, the vibrator being made of material effecting the magnetic flux and disposed inside the casing while facing the oscillator via the casing, detecting the vibration of the vibrator based on a change of the frequency-related information, determining whether the vibration of the vibrator converges during a convergence-checking time period defined by two time points set after the vibrator is vibrated by the vibration trigger, and detecting the quantity of the fluid in the casing based on a convergence determination result of the vibration of the vibrator.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 20A and 20B illustrates a flowchart illustrating the steps of a process of detecting residual quantity of toner in the sub-hopper;

FIG. 21 illustrates a change of count values related to oscillation signal of the magnetometric sensor when the vibrator is being pushed;

FIG. 22 illustrates a change of count values related to oscillation signal of the magnetometric sensor when the vibrator is released from the pushing;

FIG. 23 illustrates a change of count values related to oscillation signal of the magnetometric sensor when the vibration of the vibrator is obstructed;

FIG. 24 is an example of a table used for analyzing count values;

FIG. 25 illustrates a side view of another magnetometric sensor having another coil;

FIG. 26 illustrates a top view of another magnetometric sensor having another coil;

Figure 1:
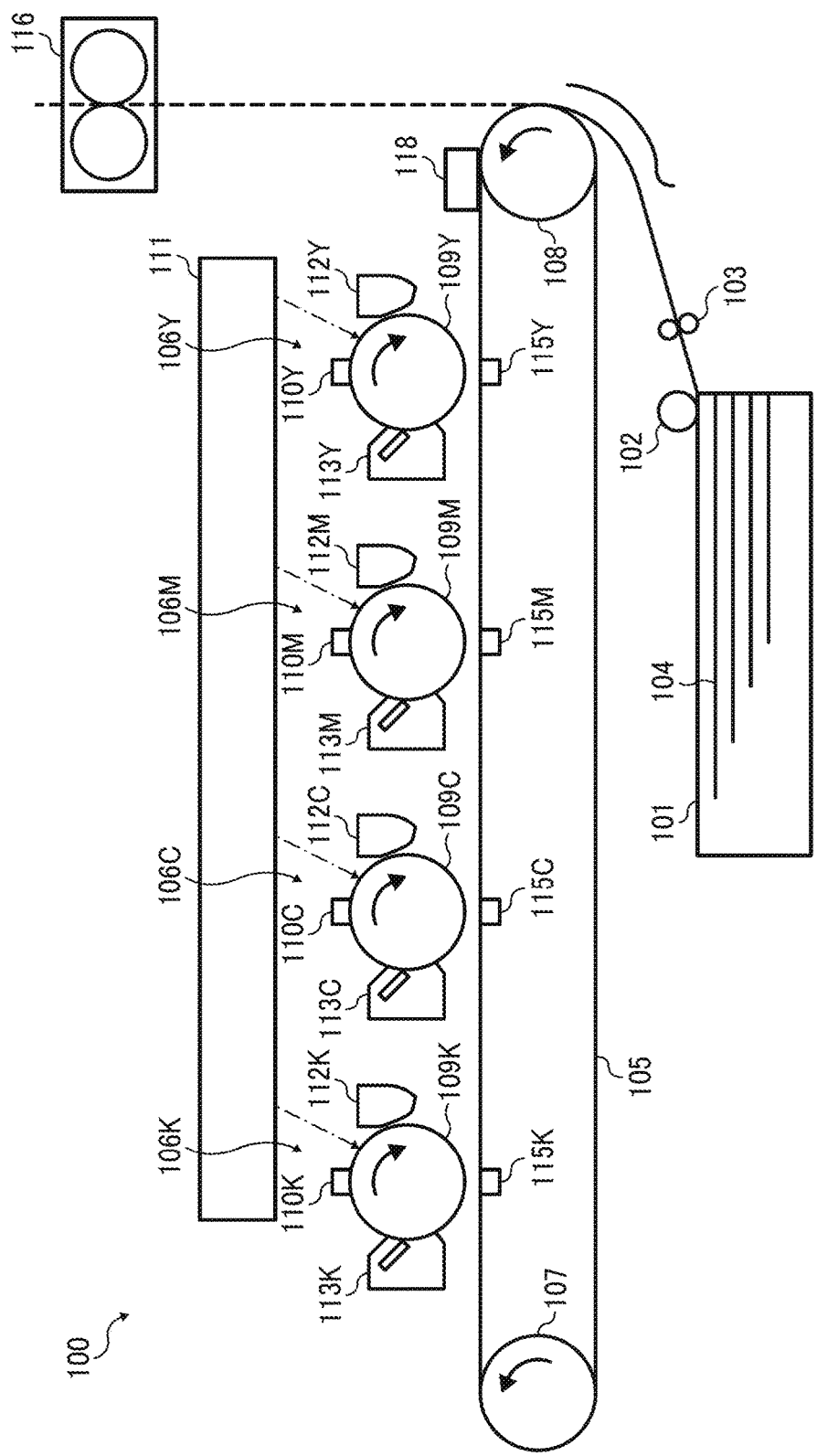
FIG. 1 illustrates a diagram of an image forming apparatus including a developing device having a magnetometric sensor of one example embodiment of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more example embodiments are described hereinafter.

A description is given of an image forming apparatus using electrophotography of one or more example embodiments with reference to the drawings. The image forming apparatus using electrophotography includes a photoconductor, a developing device, and a sub-hopper set between the developing device and a developer container that supplies developer such as toner to the sub-hopper. The sub-hopper retains toner supplied from the developer container. An electrostatic latent image formed on the photoconductor is developed by developer such as toner supplied from the developing device, and residual quantity of toner in the sub-hopper is detected. Hereinafter, a description is given of detecting a detection target fluid such as toner filled in a casing of the sub-hopper, but not limited hereto. The detection target fluid can be powder, liquid or the like that has flowability or fluidity.

FIG. 1 is a side view of an image forming apparatus 100 including a mechanism used for an image forming operation of one example embodiment. As illustrated in FIG. 1, the image forming apparatus 100 includes a plurality of image forming units 106Y, 106M, 106C, 106K for each of colors disposed along an intermediate transfer belt 105 used as an endless moveable unit, which is known as a tandem type. Specifically, the plurality of image forming units 106Y, 106M, 106C, 106K used as electrophotography process unit (hereinafter, image forming unit 106) are disposed along the intermediate transfer belt 105 from the upstream of conveyance direction of the intermediate transfer belt 105. The intermediate transfer belt 105 is formed with an intermediate transfer image to be transferred to a sheet 104 used as a recording medium fed from a sheet feed tray 101 using a sheet feed roller 102.

The sheet 104 fed from the sheet feed tray 101 is stopped by a registration roller 103 temporary, and then fed to an image transfer position of the intermediate transfer belt 105 in line with an image forming timing at the image forming unit 106.

Each of the plurality of the image forming units 106Y, 106M, 106C, 106K employ the same configuration except the color of formed tone image. The image forming unit 106K forms black image, the image forming unit 106M forms magenta image, the image forming unit 106C forms cyan image, and the image forming unit 106Y forms yellow image. Hereinafter, the image forming unit 106Y is described. Since the image forming units 106M, 106C, 106K can be operated same as the image forming unit 106Y, the image forming units 106M, 106C, 106K are not described in detail.

The intermediate transfer belt 105 is an endless belt extended by a drive roller 107 and a driven roller 108, and the intermediate transfer belt 105 can be driven by rotating the drive roller 107 and the driven roller 108. The drive roller 107 is driven by a drive motor. The drive motor, the drive roller 107 and the driven roller 108 can be collectively used as a drive unit to move the intermediate transfer belt 105 used as the endless moveable unit.

The image forming operation can be performed as follows. The image forming unit 106Y transfers a black toner image to the intermediate transfer belt 105 moving in one direction. The image forming unit 106Y includes a photoconductor drum 109Y used as a photoconductor, a charger 110Y disposed near the photoconductor drum 109Y, an optical writing device 111, a developing device 112Y, a photoconductor cleaner 113Y, and the decharger. the optical writing device 111 is configured to irradiate light to each of the photoconductor drums 109Y, 109M, 109C, 109K (hereinafter, photoconductor drum 109).

When the image forming operation is performed, the charger 110Y charges the outer face of the photoconductor drum 109Y evenly in the dark, and then the optical writing device 111 irradiate light corresponding to a yellow image to form an electrostatic latent image on the photoconductor drum 109Y. The developing device 112Y develops the electrostatic latent image as a yellow toner image to form the yellow toner image on the photoconductor drum 109Y.

The yellow toner image is then transferred from the photoconductor drum 109Y to the intermediate transfer belt 105 at a contact position or the closest position (a transfer position) by using a transfer device 115Y, with which the yellow toner image is formed on the intermediate transfer belt 105. After transferring the yellow toner image, the photoconductor cleaner 113Y removes the remaining toner from the photoconductor drum 109Y, and then the decharger decharges the photoconductor drum 109Y to set ready for a next image forming operation.

The yellow toner image transferred from the image forming unit 106Y to the intermediate transfer belt 105 is conveyed to the image forming unit 106M with the movement of the intermediate transfer belt 105. The image forming unit 106M forms a magenta toner image on the photoconductor drum 109M by performing the image forming process similar to the image forming unit 106Y, and the magenta toner image is transferred to the intermediate transfer belt 105 and superimposed to the formed yellow toner image.

The yellow toner image and the magenta toner image transferred on the intermediate transfer belt 105 are conveyed to the image forming units 106C and 106K, and a cyan toner image formed on the photoconductor drum 109C and a black toner image formed on the photoconductor drum 109K are transferred on the intermediate transfer belt 105 and superimposed to the yellow toner image and the magenta toner image already transferred on the intermediate transfer belt 105, with which a full color intermediate transfer image is formed on the intermediate transfer belt 105.

the sheet 104 stored in the sheet feed tray 101 is fed from a top sheet in the sheet feed tray 101 one by one, and the intermediate transfer image formed on the intermediate transfer belt 105 is transferred on the sheet 104 at a contact position or the most closest position with the intermediate transfer belt 105 in the sheet route, with which the image is formed on the sheet 104. The sheet 104 formed with the image is further conveyed to a fixing device 116. After the image is fixed on the sheet 104, the sheet 104 is ejected outside the image forming apparatus 100.

Further, a belt cleaner 118 is disposed for the intermediate transfer belt 105. As illustrated in FIG. 1, the belt cleaner 118 such as a cleaning blade is disposed at the downstream of the image transfer position of the intermediate transfer belt 105 to the sheet 104, and the upstream of the photoconductor drum 109. The belt cleaner 118 is pressed against the intermediate transfer belt 105 to remove the developer such as toner remaining on the intermediate transfer belt 105.

Figure 2:
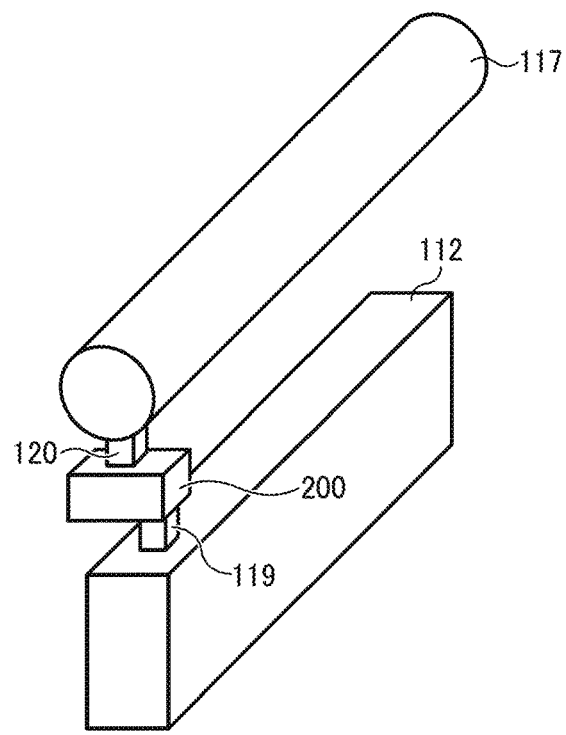
FIG. 2 illustrates a perspective view of a configuration to supply toner to the developing device of FIG. 1.

A description is given of a configuration to supply toner to the developing device 112 with reference to FIG. 2. The toner supply configuration for each of CMYK colors employs the substantially same configuration. FIG. 2 illustrates a toner supply configuration for the developing device 112. The toner is stored in a toner bottle 117. As illustrated in FIG. 2, toner is supplied from the toner bottle 117 to a sub-hopper 200 via a toner bottle supply path 120.

The sub-hopper 200 retains toner supplied from the toner bottle 117 temporary, and supplies toner to the developing device 112 depending on the residual quantity of toner in the developing device 112. The toner is supplied from the sub-hopper 200 to the developing device 112 via a sub-hopper supply path 119. When the toner inside the toner bottle 117 is reduced or becomes empty and then the toner is not supplied from the toner bottle 117 to the sub-hopper 200, the toner quantity in the sub-hopper 200 is reduced, and then a condition that the toner quantity in the sub-hopper 200 becomes smaller can be detected.

Figure 3:
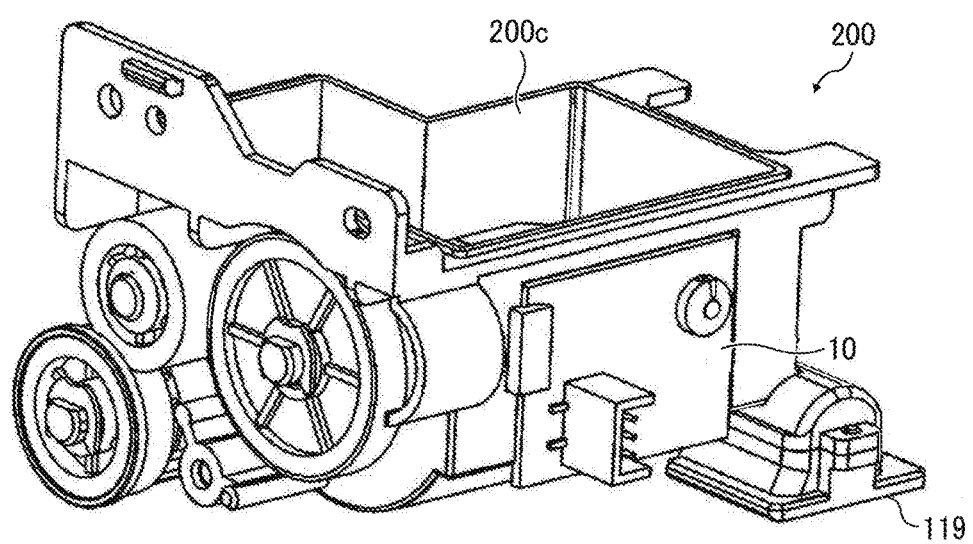
FIG. 3 illustrates one perspective view of a sub-hopper illustrated in FIG. 2.

FIG. 3 is a perspective view of the sub-hopper 200. As illustrated in FIG. 3, the sub-hopper 200 includes a casing 200c having an outer wall, and a magnetometric sensor 10 attached on the outer wall. The magnetometric sensor may be also referred to the magnetic flux sensor 10. As illustrated in FIG. 3, the upper part of the sub-hopper 200 is an opening. A cover formed to the toner bottle supply path 120 is attached to the upper part of the sub-hopper 200. Further, the toner retained inside the sub-hopper 200 is supplied to the developing device 112 via the sub-hopper supply path 119 as illustrated in FIG. 3.

Figure 4:
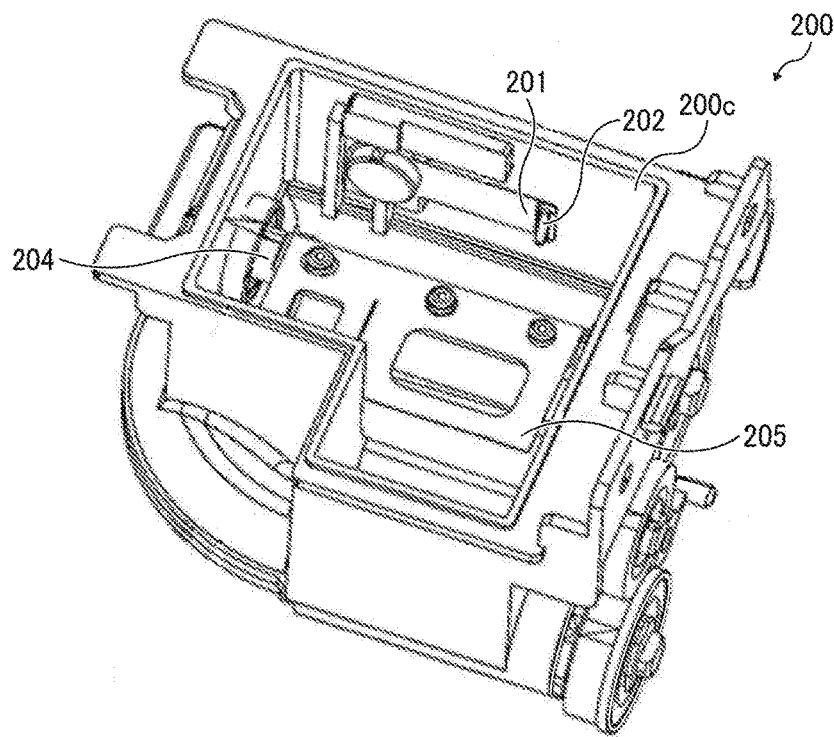
FIG. 4 illustrates another perspective view of the sub-hopper in FIG. 3.

FIG. 4 is a perspective view of the inside of the sub-hopper 200. As illustrated in FIG. 4, the sub-hopper 200 has an inner wall attached with a vibrator 201 such as vibrateable sheet or plate. The inner wall attached with the vibrator 201 is the opposite side of the outer wall attached with the magnetometric sensor 10 (FIG. 3). Therefore, the vibrator 201 disposed inside the casing 200c faces the magnetometric sensor 10 via the wall.

The vibrator 201 is, for example, a rectangular plate. One end of the vibrator 201 in the long side of the vibrator 201 is fixed to the casing 200c of the sub-hopper 200. The other end of the vibrator 201 in the long side of the vibrator 201 that is not fixed to the casing 200c has a projection 202. Therefore, the vibrator 201 is fixed to the casing 200c by fixing the one end of the vibrator 201 to the casing 200c. The other end of the vibrator 201 having the projection 202 can be used as a free end of the vibrator 201. The projection 202 used to vibrate the vibrator 201 is used to adjust the number of vibrations when the vibrator 201 vibrates.

The sub-hopper 200 includes a rotation shaft 204 and an agitator 205 to agitate or stir toner inside the casing 200c. The rotation shaft 204 is a shaft that rotates in one direction in the sub-hopper 200, and the agitator 205 is fixed to the rotation shaft 204. Therefore, when the rotation shaft 204 rotates, the agitator 205 is rotated, with which the toner inside the sub-hopper 200 is agitated.

Further, in addition to the toner agitation, when the agitator 205 is being rotated, the agitator 205 can flip the projection 202 disposed on the vibrator 201. Therefore, each time the agitator 205 is rotated for one rotation, the projection 202 is flipped by the agitator 205, with which the vibrator 201 vibrates. Therefore, the vibrator 201 can be used as a vibrator, and the agitator 205 can be used as a vibration trigger that causes the vibrator 201 to vibrate. The residual quantity of toner in the sub-hopper 200 can be detected by detecting the vibration of the vibrator 201.

Figure 5:
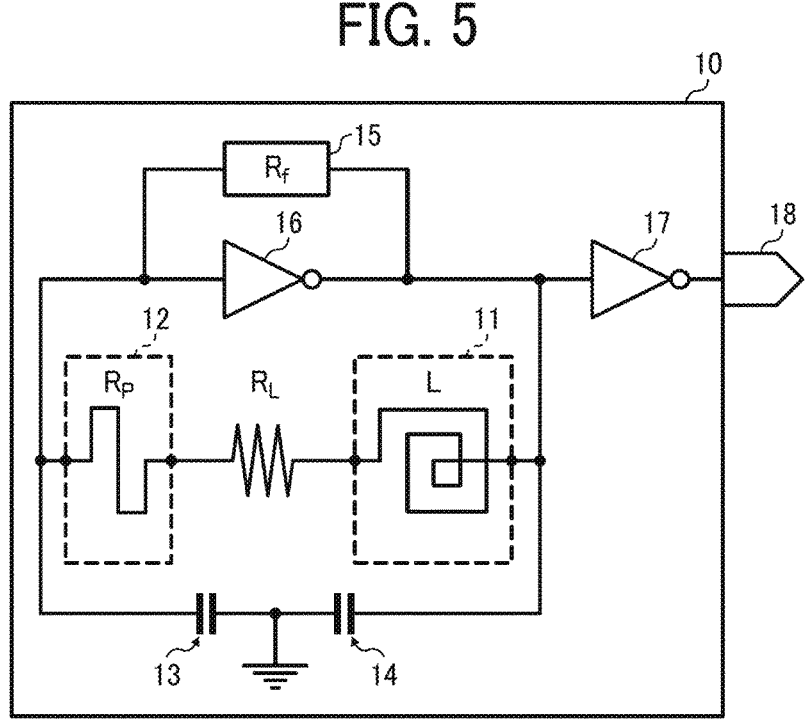
FIG. 5 illustrates a circuit configuration of the magnetometric sensor in FIG. 1.

A description is given of an internal configuration of the magnetometric sensor 10 with reference to FIG. 5. As illustrated in FIG. 5, the magnetometric sensor 10 is, for example, an oscillator circuit using a Colpitts type LC oscillator circuit, and includes, for example, a planar pattern coil 11, a pattern resistance 12, a first capacitor 13, a second capacitor 14, a feedback resistance 15, unbuffered integrated circuits (ICs) 16 and 17 and an output terminal 18.

The planar pattern coil 11 is a planar pattern coil composed of a signal wire patterned on a plane of a board configuring the magnetometric sensor 10. As illustrated in FIG. 5, the planar pattern coil 11 has inductance L obtained by the coil. As to the planar pattern coil 11, a value of the inductance L is changed by the magnetic flux that exists in a space facing the plane that the coil is formed. Therefore, the magnetometric sensor 10 can be used as an oscillator that outputs frequency signals corresponding to the magnetic flux that exists in the space facing the coil of the planar pattern coil 11.

The pattern resistance 12 is a resistance composed of a signal wire patterned on a plane of the board configuring the magnetometric sensor 10 similar to the planar pattern coil 11. The pattern resistance 12 is formed with a meandering pattern or a zig zag pattern, with which a condition that current is hard to flow can be set compared to a linear pattern. The meandering or zig zag means that the signal wire is folded for a plurality of times in given two directions.

As illustrated in FIG. 5, the pattern resistance 12 includes a resistance value $R_P$. As illustrated in FIG. 5, the planar pattern coil 11 and the pattern resistance 12 are connected in series.

The first capacitor 13 and the second capacitor 14 are used as the capacitors that configure the Colpitts type LC oscillator circuit with the planar pattern coil 11. Therefore, the first capacitor 13 and the second capacitor 14 are connected with the planar pattern coil 11 and the pattern resistance 12 in series. A loop configured by the planar pattern coil 11, the pattern resistance 12, the first capacitor 13 and the second capacitor 14 can be used as a resonance current loop.

The feedback resistance 15 is inserted to stabilize a bias voltage. By using the unbuffered IC 16 and the unbuffered IC 17, a change of voltage of the resonance current loop can be output from the output terminal 18 as a square wave or rectangular wave corresponding to the resonance frequency.

With this configuration, the magnetometric sensor 10 oscillates with a frequency f based on the inductance L, the resistance value $R_P$, and the capacitance C of the first capacitor 13 and the second capacitor 14. The frequency f can be expressed by the following formula (1).

$$f = \frac{1}{2\pi}\sqrt{\frac{1}{LC} - \left(\frac{R_L + R_P}{2L}\right)^2} \qquad (1)$$

Further, the inductance L also changes by the existence of magnetic substance and the concentration of magnetic substance existing near the planar pattern coil 11. Therefore, the magnetic permeability in the space near the planar pattern coil 11 can be detected by measuring the oscillation frequency "f" of the magnetometric sensor 10.

Further, as to the above described the sub-hopper 200, the magnetometric sensor 10 is disposed at a position facing the vibrator 201 via the casing 200c. Therefore, the magnetic flux generated by the planar pattern coil 11 passes through the vibrator 201. Then, the vibrator 201 effects the magnetic flux generated by the planar pattern coil 11, and effects the inductance L. Therefore, the vibrator 201 effects the frequency of oscillation signal of the magnetometric sensor 10 to be described later in detail.

Figure 6:
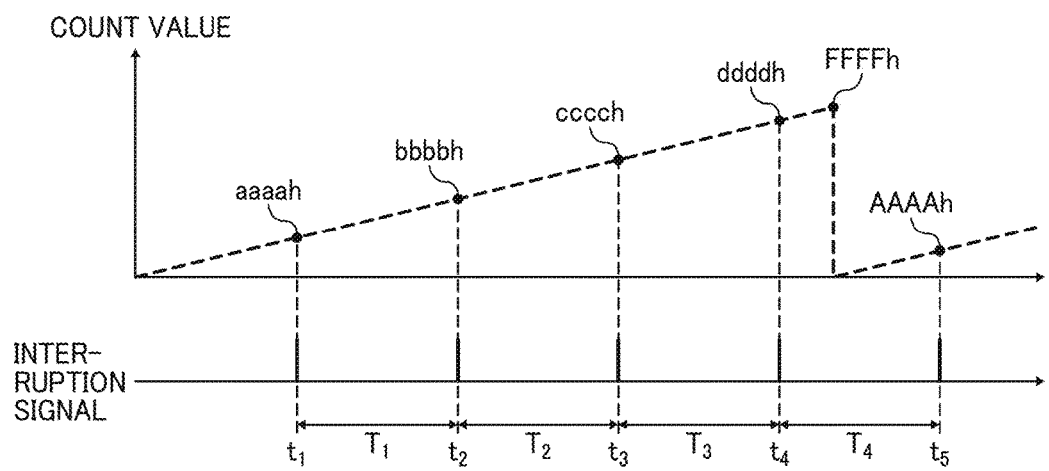
FIG. 6 illustrates a pattern of counting count values of an output signal of the magnetometric sensor.

FIG. 6 illustrates a pattern of counting count values of an output signal of the magnetometric sensor 10. If the magnetic flux generated by the planar pattern coil 11 included in the magnetometric sensor 10 does not change, the magnetometric sensor 10 continuously oscillates with the same frequency. In this case, as illustrated in FIG. 6, the count value of a counter increases with a given rate over time, and the count values such as aaaah, bbbbh, ccch, ddddh, and AAAAh can be acquired at respective time points $t_1$, $t_2$, $t_3$, $t_4$, and $t_5$ as illustrated in FIG. 6.

By calculating the count value at each of the respective time points based on respective time periods $T_1$, $T_2$, $T_3$, and $T_4$ of FIG. 6, the frequency at the respective time periods can be calculated. For example, when the reference clock such as 2 (milli seconds) is counted and an interruption signal is output to calculate the frequency, the count value at each of the respective time periods is divided by 2 (milli seconds), with which the oscillation frequency "f" (Hz) of the magnetometric sensor 10 at each of the respective time periods $T_1$, $T_2$, $T_3$, and $T_4$ in FIG. 6 can be calculated.

Further, if the upper limit of the count value of the counter is "FFFFh" as illustrated in FIG. 6, the frequency at the time period T4 can be calculated as follows. A value obtained by subtracting "ddddh" from "FFFFh" is added to a value of the "AAAAh" as a total value, and the total value is divided by 2 (milli seconds) to calculate the oscillation frequency "f" (Hz).

As to the image forming apparatus 100, the frequency signal oscillated by the magnetometric sensor 10 is acquired. Based on the acquisition result of the frequency signal, an event or situation corresponding to the oscillation frequency f of the magnetometric sensor 10 can be determined. Then, as to the magnetometric sensor 10, the inductance L of the planar pattern coil 11 changes based on the vibration state of the vibrator 201 disposed at the opposite side of the planar pattern coil 11 of the magnetometric sensor 10, and then the frequency signal output from the output terminal 18 changes.

Then, a main controller of the image forming apparatus 100 acquires the frequency signal output from the output terminal 18, and the main controller can detect the vibration state of the vibrator 201 disposed at the opposite side of the planar pattern coil 11. Based on the detected vibration state of the vibrator 201, the condition of the developer in the sub-hopper 200 can be determined.

Further, as above described, the frequency can be acquired by dividing the count value of the oscillation signal by the given time period. If the time period to acquire the count value is a fixed period, the acquired count value can be used as a parameter indicating the frequency without dividing the count value of the oscillation signal by the given time period.

Figure 7:
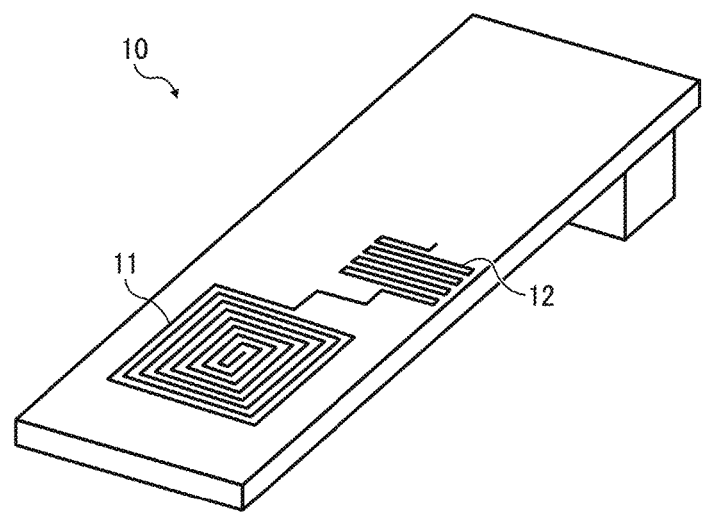
FIG. 7 illustrates a perspective view of the magnetometric sensor.

FIG. 7 is a perspective view of the magnetometric sensor 10. As illustrated in FIG. 7, the planar pattern coil 11 and the pattern resistance 12 (see FIG. 5) are formed one face of the magnetometric sensor 10 used as a detection face. The detection face is faced to the space to detect the magnetic permeability of the space.

As illustrated in FIG. 7, the pattern resistance 12 connected with the planar pattern coil 11 in series is patterned on the detection face formed with the planar pattern coil 11. As described with reference to FIG. 5, the planar pattern coil 11 is the signal wire formed with a spiral pattern on the detection face. Further, the pattern resistance 12 is the signal wire pattern formed with the meandering or zig zag pattern on the detection face. The above described capability of the magnetometric sensor 10 can be devised by using these patterns of the planar pattern coil 11 and the pattern resistance 12 c.

A portion of the magnetometric sensor 10 formed with the planar pattern coil 11 and the pattern resistance 12 is used as a detection unit to detect the magnetic permeability. When the magnetometric sensor 10 is attached to the sub-hopper 200, the detection unit of the magnetometric sensor 10 is faced to the vibrator 201.

Figure 8:
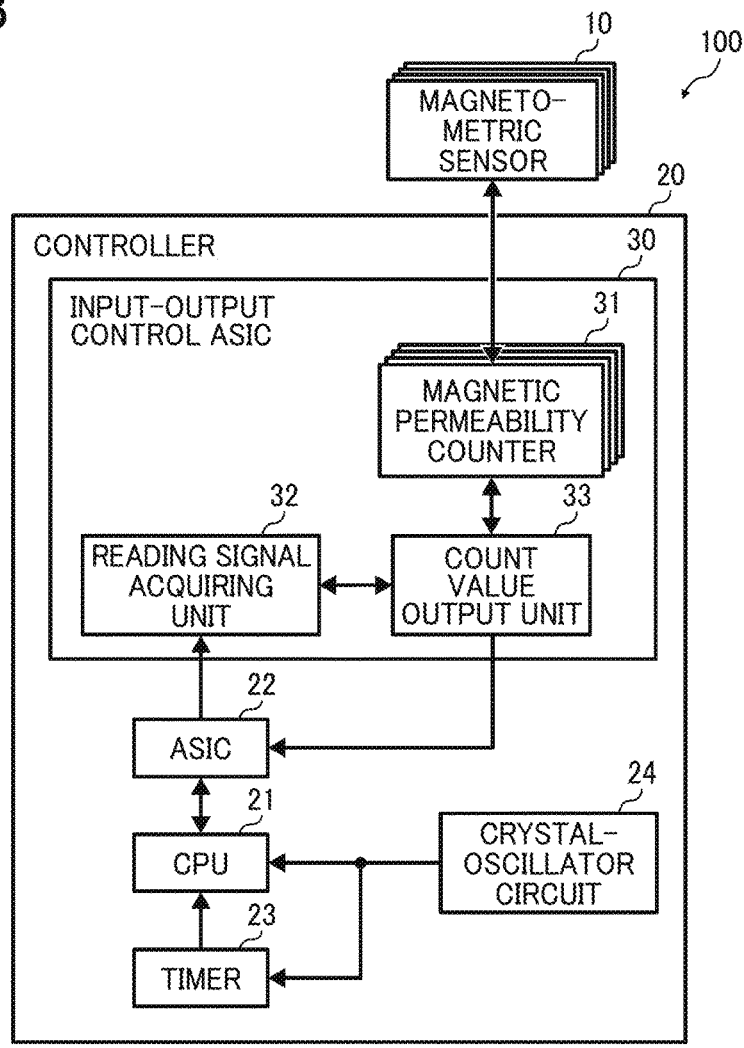
FIG. 8 illustrates a block diagram of a controller that acquires an output value of the magnetometric sensor.

A description is given of a configuration to acquire an output value of the magnetometric sensor 10 in the image forming apparatus 100 with reference to FIG. 8. FIG. 8 illustrates a configuration of a controller 20 that acquires the output value of the magnetometric sensor 10 to control the image forming apparatus 100. As illustrated in FIG. 8, the controller 20 includes, for example, a central processing unit (CPU) 21, an application specific integrated circuit (ASIC) 22, a timer 23, a crystal-oscillator circuit 24 and an input-output control ASIC 30. The configuration including the controller 20 of FIG. 8 can be used as a fluid detection apparatus such as a developer detection apparatus that can detect the quantity of the developer.

The CPU 21 is a processor that performs the computing by using programs stored in a memory such as a read only memory (ROM), and controls the controller 20 entirely. The ASIC 22 can be used as an interface for a system bus connecting to the CPU 21 and a random access memory (RAM), and other devises.

The timer 23 generates an interruption signal each time the count value of the reference clock input from the crystal-oscillator circuit 24 becomes a given value, and outputs the interruption signal to the CPU 21. Based on the interruption signal input from the timer 23, the CPU 21 outputs a reading signal to acquire the output value of the magnetometric sensor 10. The crystal-oscillator circuit 24 oscillates the reference clock that activates each of the devices in the controller 20.

The input-output control ASIC 30 acquires a detection signal output from the magnetometric sensor 10, and converts the detection signal to information that can be processed by the controller 20. As illustrated in FIG. 8, the input-output control ASIC 30 includes, for example, a magnetic permeability counter 31, a reading signal acquiring unit 32 and a count value output unit 33. As above described, the magnetometric sensor 10 is the oscillator circuit that outputs the square wave or rectangular wave having the frequency matched to the magnetic permeability of the space, which is the detection target space.

The magnetic permeability counter 31 is a counter that increments a value based on the square wave or rectangular wave output from the magnetometric sensor 10. Therefore, the magnetic permeability counter 31 can be used as a signal counter that counts the number of signals used for calculating the frequency-of the calculation target signal. Further, the magnetometric sensor 10 can be disposed for each of the sub-hoppers 200 connected to each of the developing devices 112 of each of CMYK color, which means a plurality of the magnetometric sensors 10 can be disposed, and thereby a plurality of the magnetic permeability counters 31 can be disposed for the plurality of the magnetometric sensors 10.

The reading signal acquiring unit 32 acquires the reading signal, which is an acquisition command of the count value of the magnetic permeability counter 31, from the CPU 21 via the ASIC 22. When the reading signal acquiring unit 32 acquires the reading signal from the CPU 21, the reading signal acquiring unit 32 inputs a signal to the count value output unit 33 to output the count value from the count value output unit 33. The count value output unit 33 outputs the count value of the magnetic permeability counter 31 as a response to the signal input from the reading signal acquiring unit 32.

Further, the access from the CPU 21 to the input-output control ASIC 30 can be performed via, for example, a register. Therefore, the above described reading signal is written in a given register included in the input-output control ASIC 30 by the CPU 21. Further, the count value output from the count value output unit 33 is stored in the given register included in the input-output control ASIC 30, and then the count value is acquired by the CPU 21. The controller 20 of FIG. 8 can be disposed separately from the magnetometric sensor 10 or can be implemented on the board of the magnetometric sensor 10 as a circuit including the CPU 21.

Further, the input-output control ASIC 30 receives the oscillation signal from the magnetometric sensor 10, and supplies power to activate the magnetometric sensor 10. The power that activates the magnetometric sensor 10 is, for example, 3.3 volts. Further, the magnetometric sensor 10 is connected to a system ground of the input-output control ASIC 30 via a connection line of the system ground.

In the above described configuration, the CPU 21 detects the vibration state of the vibrator 201 based on the count values acquired from the count value output unit 33, and detects the residual quantity of toner inside the sub-hopper 200 based on the detection result of the vibration state of the vibrator 201. Therefore, when the CPU 21 such as a processor or circuitry performs the computing by executing one or more programs, the CPU 21 performs the detection process. Further, the count values acquired from the count value output unit 33 can be used as the frequency-related information indicating the frequency of the magnetometric sensor 10 that changes depending on the vibration state of the vibrator 201. The count value acquired by the count value output unit 33 is, for example, the number of vibrations of the vibrator 201 when the vibrator 201 is vibrating.

Figure 9:
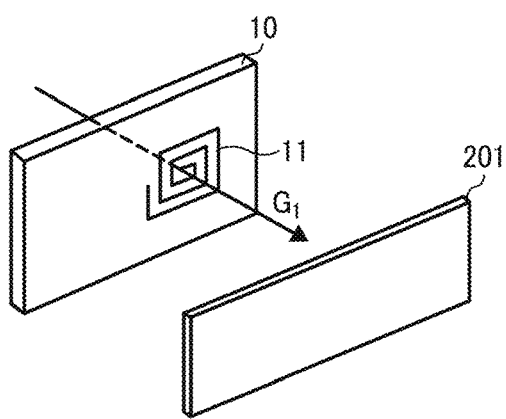
FIG. 9 illustrates a layout of the magnetometric sensor and a vibrator.

A description is given of an effect of the vibrator 201 to the oscillation frequency "f" of the magnetometric sensor 10 with reference to drawings. As illustrated in FIG. 9, the detection face of the magnetometric sensor 10 formed with the planar pattern coil 11 is faced to the vibrator 201 via the casing 200c of the sub-hopper 200. As illustrated in FIG. 9, when a magnetic flux $G_1$ is generated at the center of the planar pattern coil 11, the magnetic flux $G_1$ passes through the vibrator 201.

Figure 10:
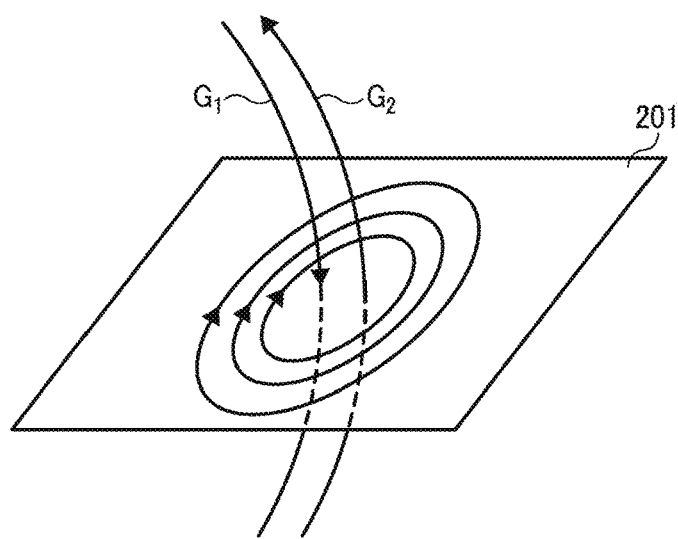
FIG. 10 illustrates a magnetic flux that passes through the vibrator, and an effect to the magnetic flux from the vibrator.
Figure 11:
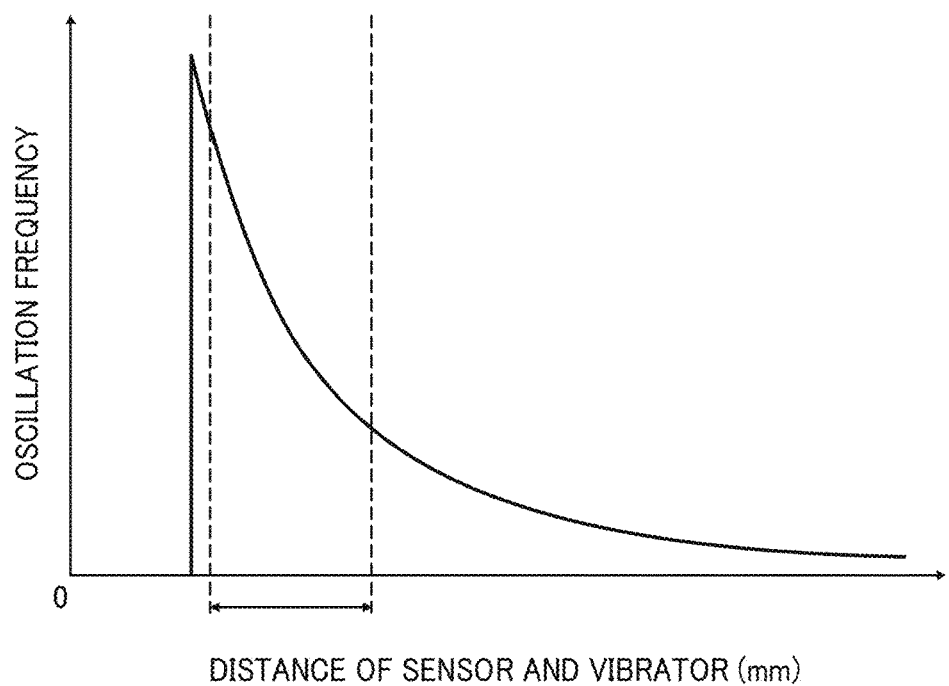
FIG. 11 illustrates an example of oscillation frequency of the magnetometric sensor depending on a distance between a planar pattern coil and the vibrator.

The vibrator 201 can be made of metal such as a stainless steel (SUS) plate. As illustrated in FIG. 10, when the magnetic flux $G_1$ passes through the vibrator 201, the eddy current occurs in the vibrator 201. Then, the eddy current generates a magnetic flux $G_2$ to at least partially cancel or offset the magnetic flux $G_1$ generated by the planar pattern coil 11. By cancelling the magnetic flux $G_1$, the inductance L at the magnetometric sensor 10 decreases. As indicated in the above formula (1), when the inductance L decreases, the oscillation frequency "f" increases. The strength of the eddy current that occurs in the vibrator 201 by receiving the magnetic flux $G_1$ from the planar pattern coil 11 changes depending on the strength of the magnetic flux $G_1$, and a distance between the planar pattern coil 11 and the vibrator 201. FIG. 11 illustrates an example of the oscillation frequency "f" of the magnetometric sensor 10 depending on the distance between the planar pattern coil 11 and the vibrator 201.

The strength of the eddy current occurring in the vibrator 201 is inverse proportional to the distance between the planar pattern coil 11 and the vibrator 201 as indicated in FIG. 11. Therefore, as indicated in FIG. 11, the smaller the distance between the planar pattern coil 11 and the vibrator 201, the higher the oscillation frequency "f" of the magnetometric sensor 10. If the distance between the planar pattern coil 11 and the vibrator 201 becomes smaller than a given distance (e.g., distance $g_0$ in FIG. 11), the inductance L becomes too low, and then the magnetometric sensor 10 does not oscillate.

Therefore, when the distance becomes the distance $g_0$ or less, the oscillation frequency "f" becomes zero as indicated in FIG. 11. By contrast, when the distance between the planar pattern coil 11 and the vibrator 201 becomes greater, the oscillation frequency "f" of the magnetometric sensor 10 converges to a frequency that is not effected by the eddy current occurring in the vibrator 201.

As to the sub-hopper 200, the vibration of the vibrator 201 can be detected based on the oscillation frequency "f" of the magnetometric sensor 10 by using the property indicated in FIG. 11. Based on the detected vibration of the vibrator 201, the residual quantity of toner inside the sub-hopper 200 can be detected. Therefore, the vibrator 201 (FIG. 9), the magnetometric sensor 10 (FIG. 9), and the configuration for processing the output signal of the magnetometric sensor 1 can be used as the fluid detection apparatus of the one or more example embodiment.

The vibration of the vibrator 201 flipped by the agitator 205 can be determined by eigenfrequency defined by the stiffness of the vibrator 201 and a weight of the projection 202, and an attenuation rate defined by external factors that absorbs the vibration energy. The external factors that absorb the vibration energy includes a fixing strength of a fixing part that fixes the one end of the vibrator 201, a fixing factor such as air resistance, and existence of toner contacting the vibrator 201 inside the sub-hopper 200.

The quantity of the toner that contacts the vibrator 201 inside the sub-hopper 200 changes depending on the residual quantity of toner in the sub-hopper 200. Therefore, by detecting the vibration of the vibrator 201, the residual quantity of toner in the sub-hopper 200 can be detected. Therefore, in the sub-hopper 200, when the agitator 205 that can agitate the toner in the sub-hopper 200 rotates, the agitator 205 flips the vibrator 201 and vibrates the vibrator 201.

Figure 12:
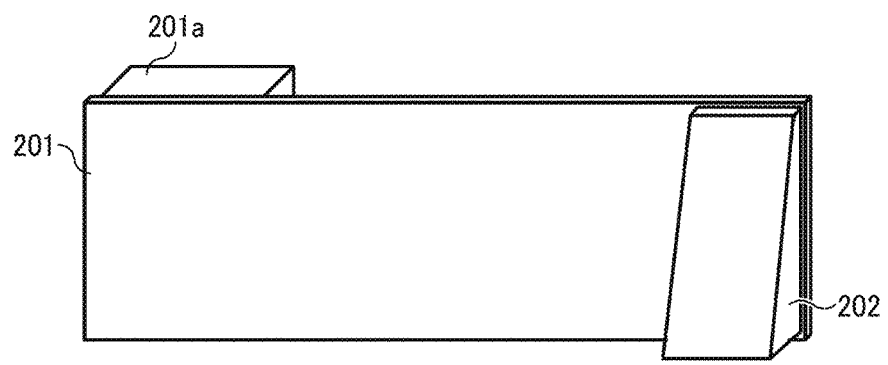
FIG. 12 illustrates a perspective view of a layout of parts of the vibrator.

A description is given of a layout of parts of the vibrator 201 and a configuration that the agitator 205 can flip the vibrator 201 in the sub-hopper 200. FIG. 12 is a perspective view of a layout of parts of the vibrator 201. As illustrated in FIG. 12, the vibrator 201 is fixed to the casing 200c via a fixed portion 201a of the sub-hopper 200.

Figure 13:
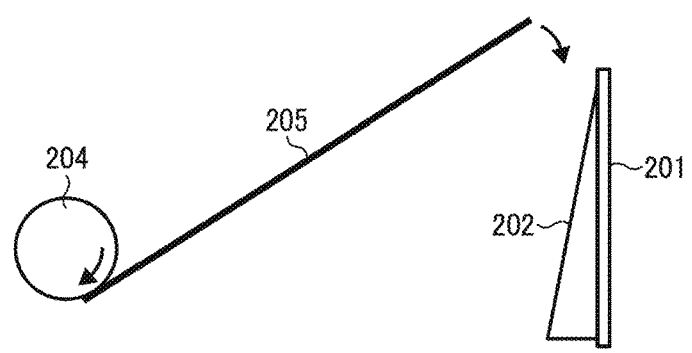
FIG. 13 illustrates a side view of an agitator and the vibrator before the agitator contacts the vibrator.

FIG. 13 is a side view of the agitator 205 and the vibrator 201 before the agitator 205 contacts the projection 202 attached to the vibrator 201, in which the rotation shaft 204 is being rotated. In a case of FIG. 13, the rotation shaft 204 rotates in the clockwise direction to rotate the agitator 205 in the clockwise direction.

Figure 14:
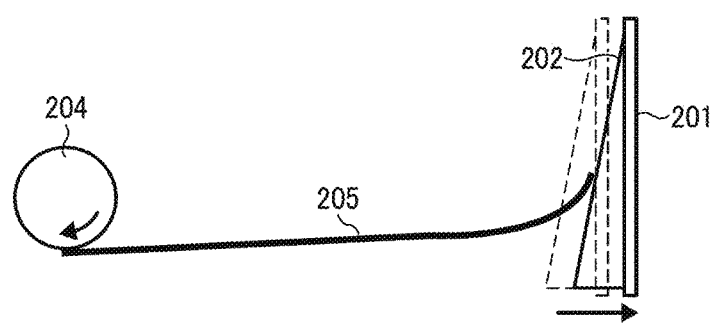
FIG. 14 illustrates a side view of the agitator and the vibrator when the agitator contacts and pushes the vibrator.

As illustrated in FIG. 13, the projection 202 is, for example, a slanted portion with respect to the face of the vibrator 201 when viewed from the side of the vibrator 201. When the agitator 205 flips the vibrator 201 to vibrate the vibrator 201, the slanted portion of the projection 202 is pushed by the agitator 205. FIG. 14 is a side view of the agitator 205 and the vibrator 201 when the agitator 205 contacts and pushes the projection 202 by rotating the agitator 205 from the position of FIG. 13.

By further rotating the agitator 205 while being contacted to the projection 202, the vibrator 201 is pushed along the slanted portion of the projection 202. In FIG. 14, the positions of the vibrator 201 and the projection 202 that are not pushed by the agitator 205 (hereinafter, stationary state or normal state) are indicated by dot lines. As illustrated in FIG. 14, the vibrator 201 and the projection 202 can be pushed by the agitator 205.

Figure 15:
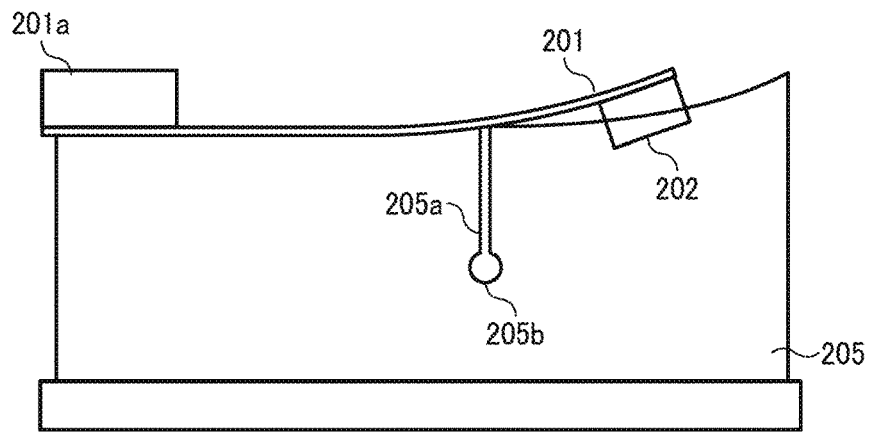
FIG. 15 illustrates a top view of the vibrator and the agitator at a position of FIG. 14.

FIG. 15 illustrates a top view of the vibrator 201 at the position of FIG. 14. Since the vibrator 201 is fixed to the inner wall of the casing 200c via the fixed portion 201a in the sub-hopper 200, the one end position of the vibrator 201 at the fixed portion 201a does not change. By contrast, when the agitator 205 is pushing the vibrator 201, the other end of the vibrator 201 having the projection 202 (i.e., free end) deforms and moves to a direction far from the rotation shaft 204. Therefore, the vibrator 201 deforms and warps using the fixed portion 201a as base point as illustrated in FIG. 15. Under this deformed state, energy to vibrate the vibrator 201 is accumulated.

As illustrated in FIG. 15, the agitator 205 does not contact the projection 202 at the left side of the cut out 205a while the agitator 205 contacts the projection 202 at the right side of the cut out 205a. With employing this configuration, when the agitator 205 is pushing the projection 202, an extremely great force may not be applied to the vibrator 201 and thereby the damage of the agitator 205 can be prevented.

Further, the cut out 205a has a circle portion 205b at the start point of the cut out 205a. With employing this configuration, even if the deformation of the agitator 205 becomes different at the right side and the left side of the cut out 205a, the stress occurring to the start point of the cut out 205a can be dispersed, and can prevent the damage of the agitator 205.

Figure 16:
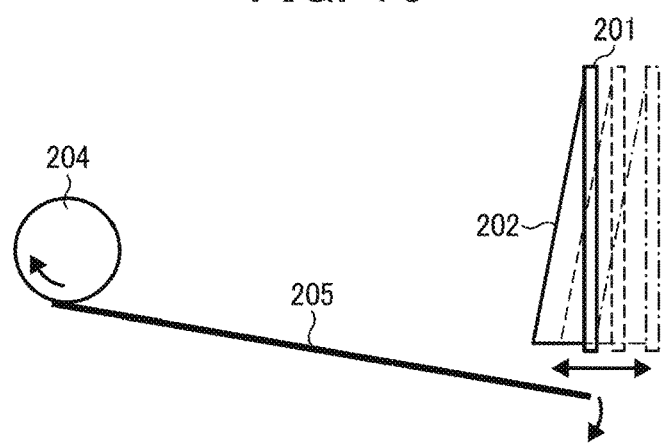
FIG. 16 illustrates a side view of the agitator and the vibrator when the agitator leaves from the vibrator.

FIG. 16 is a side view of the agitator 205 and the vibrator 201 when the agitator 205 leaves from the vibrator 201 after the agitator 205 is further rotated from the position of FIG. 14. In FIG. 16, the position of the vibrator 201 at the stationary state is indicated by a dot line, the position of the vibrator 201 illustrated in FIG. 14 is indicated by an alternate long and short dash line. Further, the position of the vibrator 201 that moves to a direction closer to the rotation shaft 204 by releasing the vibration energy accumulated by the pushing force of the agitator 205 is indicated by a solid line.

Figure 17:
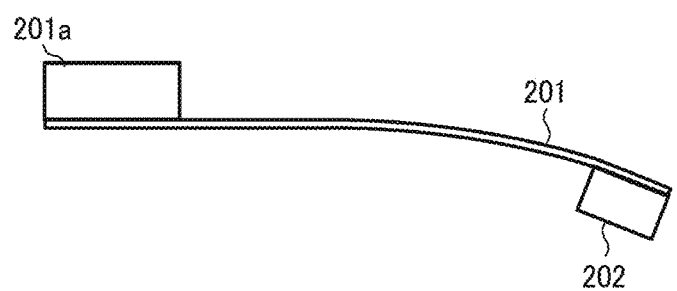
FIG. 17 illustrates a top view of the vibrator at a position of FIG. 16.

FIG. 17 illustrates a top view of the vibrator 201 at the position of FIG. 16. As illustrated in FIG. 16, when the pushing of the agitator 205 to the projection 202 is released, the free end of the vibrator 201 having the projection 202 moves to the direction closer to the rotation shaft 204 using the deformation energy accumulated in the vibrator 201.

FIGS. 16 and 17 illustrates a that the vibrator 201 is at a far position from the magnetometric sensor 10, wherein the vibrator 201 faces the magnetometric sensor 10 via the casing 200c of the sub-hopper 200. While the vibrator 201 is vibrating, the vibrator 201 vibrates between a far and a closer position with respect to the magnetometric sensor 10. Specifically, the vibrator 201 vibrates to the far position from the magnetometric sensor 10 compared from the stationary state, and then the vibrator 201 vibrates to the closer position to the magnetometric sensor 10 compared from the stationary state. By repeating this vibration pattern, the vibrator 201 returns to the stationary state due to the attenuation of vibration.

Figure 18:
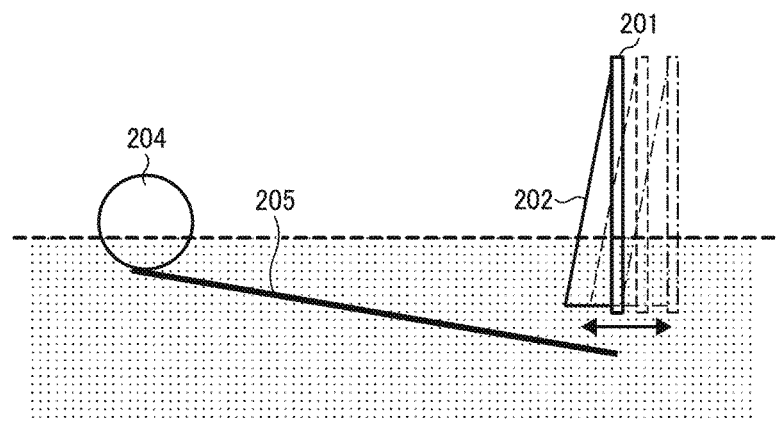
FIG. 18 illustrates a side view of the vibrator vibrating when developer exists inside the sub-hopper.

FIG. 18 illustrates a condition of the vibrator 201 existing inside the sub-hopper 200 filled with toner indicated by dots. When the toner exists inside the sub-hopper 200 as illustrated in FIG. 18, the vibrator 201 and the projection 202 contacts the toner while the vibrator 201 is vibrating. Therefore, when the toner exists inside the sub-hopper 200, the vibration of the vibrator 201 attenuates faster than a case when the toner does not exist in the sub-hopper 200. Based on the change of the attenuation of vibration, the residual quantity of toner inside the sub-hopper 200 can be detected.

Figure 19:
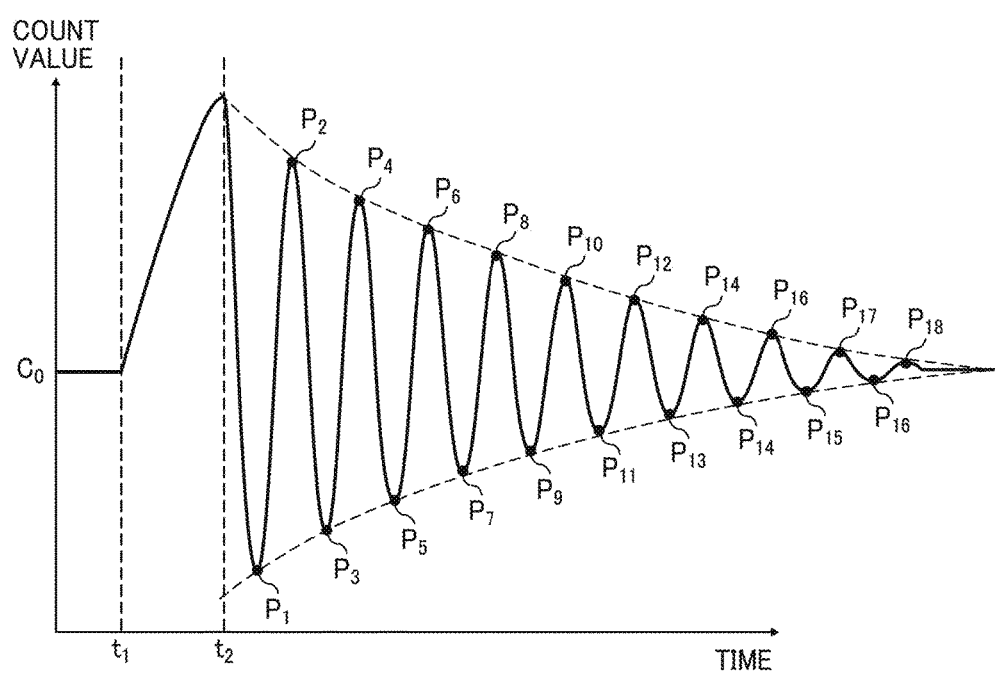
FIG. 19 illustrates a change of count values related to oscillation signal of the magnetometric sensor being acquired at each time point until the vibration of the vibrator attenuates.

FIG. 19 illustrates a change of the count values related to the oscillation signal of the magnetometric sensor 10 being acquired at each time point until the vibration of the vibrator 201 attenuates and then stops the vibration after the agitator 205 flips the projection 202. The higher the oscillation frequency "f", the greater the count value of the oscillation signal of the magnetometric sensor 10. Therefore, the vertical axis of FIG. 19 can be set as the oscillation frequency "f" instead of the count value.

As illustrated in FIG. 19, when the agitator 205 starts to contact and push the projection 202 at a time point $t_1$, the vibrator 201 is moved closer to the magnetometric sensor 10. With the movement of the vibrator 201, the oscillation frequency "f" of the magnetometric sensor 10 increases and the count value increases after the time point $t_1$ as illustrated in FIG. 19.

Then, when the pushing of the agitator 205 to the projection 202 is ended and the agitator 205 leaves from the projection 202 at a time point $t_2$, the vibrator 201 starts to vibrate using the vibration energy accumulated in the vibrator 201 during the pushing of the vibrator 201. When the vibrator 201 is vibrating, the distance between the vibrator 201 and the magnetometric sensor 10 repeatedly increases and decreases from a distance at the stationary state of the vibrator 201 that is indicated by the count value $C_0$ in FIG. 19. Consequently, the frequency of the oscillation signal of the magnetometric sensor 10 changes in line with the vibration of the vibrator 201, and also the count value at each of the counting time points changes or fluctuates similarly.

As indicated in FIG. 19, the amplitude of the vibration of the vibrator 201 becomes smaller as the vibration energy is consumed. Therefore, the vibration of the vibrator 201 attenuates over time and the change of the distance between the vibrator 201 and the magnetometric sensor 10 becomes smaller over time. As illustrated in FIG. 19, the count values change over time similarly.

As above described, the vibration of the vibrator 201 attenuates faster when the residual quantity of toner existing in the sub-hopper 200 is greater. Therefore, by analyzing the attenuation of the oscillation signal of the magnetometric sensor 10, the attenuation pattern of the vibration of the vibrator 201 can be detected, with which the residual quantity of toner inside the sub-hopper 200 can be detected.

As illustrated in FIG. 19, when the peaks of the count values are set as $P_1$, $P_2$, $P_3$, $P_4$ and so on, the attenuation rate $\zeta$ of the vibration of the vibrator 201 can be computed by using, for example, a below formula (2). As indicated in the formula (2), by using a ratio of peak values at different time points, an error caused by environmental changes can be canceled, and thereby the attenuation rate can be obtained correctly. The CPU 21 can compute the attenuation rate $\zeta$ based on a ratio of the count values acquired at the different time points.

$$\zeta = \frac{P_6 - P_5}{P_2 - P_1} \tag{2}$$

The formula (2) uses peaks $P_1$, $P_2$, $P_5$, and $P_6$ of the peaks illustrated in FIG. 19, but not limited thereto. The formula (2) can use other peaks. However, it is preferred that the formula (2) does not use the peak at the time point $t_2$ when the vibrator 201 pushed by the agitator 205 is at the position closest to the magnetometric sensor 10 because the peak at the time point $t_2$ may be superimposed with an error caused by a sliding noise due to the friction between the agitator 205 and the projection 202.

Even if the attenuation of vibration becomes faster due to the existence of toner in the sub-hopper 200 as illustrated in FIG. 18, the number of vibrations of the vibrator 201 may not change greatly. Therefore, by calculating the ratio of the amplitude of specific peaks as indicated in the formula (2), the attenuation of amplitude in the specific time period can be calculated.

The residual quantity of toner inside the sub-hopper 200 can be detected based on the above described configuration. Further, if the toner remains in the sub-hopper 200 too much, the vibration of the vibrator 201 is obstructed strongly, and thereby the vibrator 201 vibrates little. For example, when the attenuation rate is to be obtained by using the formula (2), the peaks $P_5$ and $P_6$ are acquired to be obtained. However, if the vibrator 201 vibrates little, the peaks $P_5$ and $P_6$ may not be acquired, in which the calculation of the attenuation rate $\zeta$ cannot be performed. A description is given of a configuration of one example embodiment to cope with the situation when the vibrator 201 vibrates little.

A situation that the vibration of the vibrator 201 is obstructed strongly and thereby the vibrator 201 vibrates little may occur when, for example, toner is tightly filled in the sub-hopper 200 so that a space that the vibrator 201 can vibrate does not exist in the sub-hopper 200. In this case, since the toner is filled sufficiently in the sub-hopper 200, even if the calculation of the attenuation rate becomes an error, an alert notice requesting the toner supply is not required.

Therefore, without calculating the attenuation rate $\zeta$, it can determine that the toner is filled sufficiently in the sub-hopper 200 based on a result that the vibrator 201 vibrates little. A description is given of a detection method of the residual quantity of toner, in which the residual quantity of toner can be detected even if the vibrator 201 vibrates little.

Figure 20B:
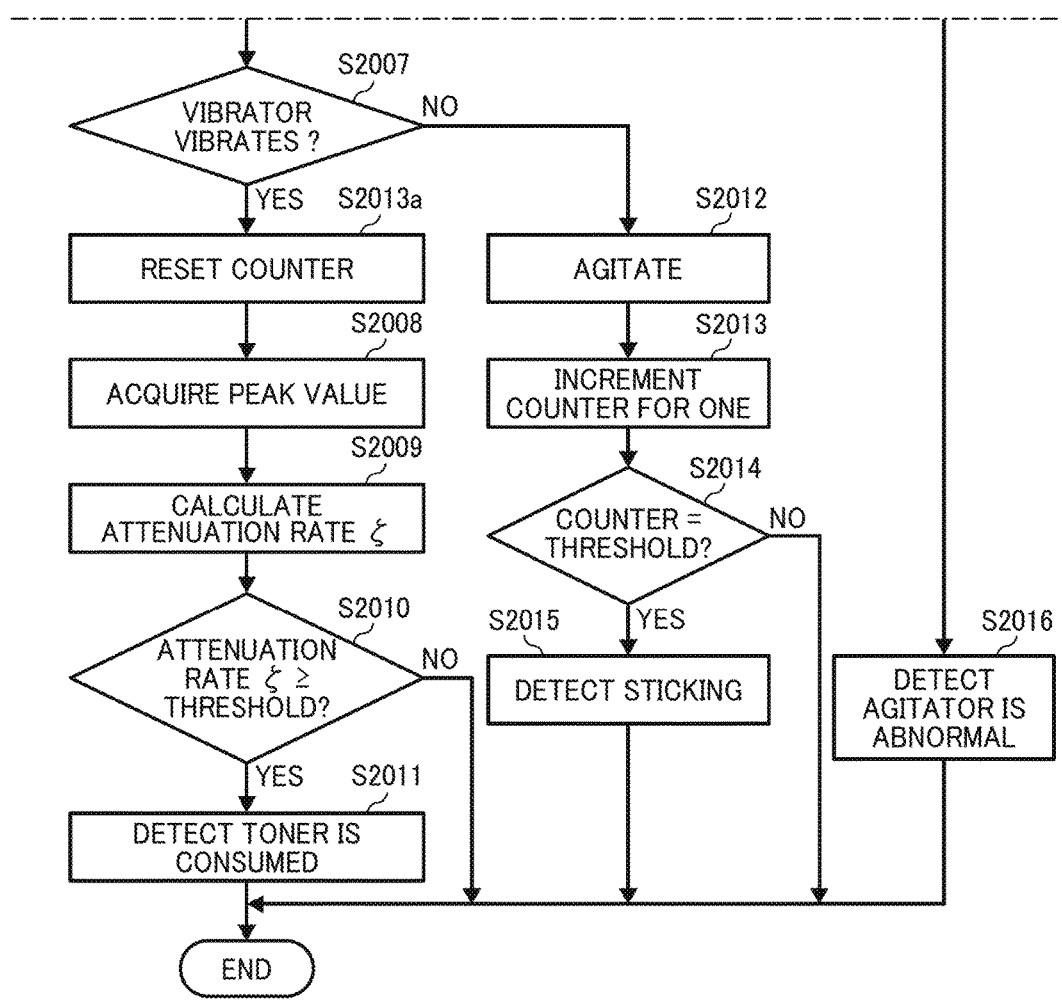

FIGS. 20A and 20B illustrate a flowchart illustrating the steps of a process of detecting the residual quantity of toner in the sub-hopper 200. The steps of detecting the residual quantity of toner of FIG. 20 can be performed by the CPU 21 (see FIG. 8). Therefore, when the CPU 21 performs the computing by executing specific programs, the CPU 21 such as the circuitry or processor can perform the detection processing. As illustrated in FIG. 20, when the agitator 205 is started to rotate, the CPU 21 starts to count a first time period "Ts" (S2001). The counting of the first time period "Ts" is started while the magnetometric sensor 10 is outputting the count value $C_0$ (see FIG. 19). When the first time period "Ts" is being counted, the projection 202 can be contacted and pushed by the agitator 205. The step S2001 is performed when the agitator 205 is rotated. For example, the agitator 205 is started to rotate at the same time when the counting of the first time period "Ts" is started.

Then, while the counted first time period "Ts" is less than a given time period threshold (S2002: YES), the CPU 21 checks or determines whether the pushing of the vibrator 201 via the projection 202 (see FIG. 14) is started (S2003). FIG. 21 illustrates a profile used for determining the pushing of the vibrator 201 at S2003. As described with reference to FIG. 19, when the agitator 205 is being rotated, the agitator 205 starts to push the vibrator 201 at the time point $t_1$, and then the count value increases because the vibrator 201 being pushed by the agitator 205 comes to a position closer to the magnetometric sensor 10. Then, when the count value increases to a count threshold $C_1$, which is a pre-set value, the CPU 21 starts to count a pushing time period indicating that the vibrator 201 is being pushed, in which the CPU 21 uses the count threshold $C_1$ to determine that the vibrator 201 is pushed.

The CPU 21 continues to count the pushing time period while the count values of the oscillation signal of the magnetometric sensor 10 are being greater than the count threshold $C_1$. Then, when the pushing time period counted by the CPU 21 becomes a pushing time period threshold $T_{th1}$ (see FIG. 21) while the count values of the oscillation signal of the magnetometric sensor 10 are being greater than the count threshold $C_1$, the CPU 21 determines that the pushing of the vibrator 201 is already started at the time point $t_1$ (see FIG. 21).

The count threshold $C_1$ can be obtained based on the above described count value $C_0$ and the maximum value Cmax of the count value that can be obtained empirically. For example, the count threshold $C_1$ can be obtained as $C_1=(Cmax+C_0)/2$. Further, the pushing time period threshold $T_{th1}$ can be set based on a cycle of the count values corresponding to the vibration of the vibrator 201 that can be obtained empirically. For example, the pushing time period threshold $T_{th1}$ can be set by multiplying the vibration cycle of the vibration of the vibrator 201 for two times when the vibrator 201 vibrates as illustrated in FIG. 19.

By contrast, if the CPU 21 does not detect the start of pushing of the vibrator 201 (S2003: NO) and the counted first time period "Ts" becomes the given time period threshold (S2002: NO), the CPU 21 detects that the agitator 205 may be abnormal because the vibrator 201 is not yet pushed even if the agitator 205 is rotated for the given time period threshold (S2016). Therefore, the given time period threshold used for the determination at S2002 can be set based on the rotation cycle of the agitator 205. For example, one rotation time of the agitator 205 can be used as the given time period threshold at S2002. After S2016, the CPU 21 reports that the agitator 205 is abnormal to a user.

If the CPU 21 detects the pushing of the vibrator 201 (S2003: YES), then the CPU 21 starts to count a second time period "Te" used for counting a time point when the pushed projection 202 is to be released (S2004). Then, until the second time period "Te" becomes a given time period threshold (S2005: YES), the CPU 21 determines whether the pushing of the vibrator 201 is released as indicated in FIG. 16 (S2006).

FIG. 22 illustrates a profile used for determining the releasing of the vibrator 201 at S2006. As illustrated in FIG. 22, when the CPU 21 detects the pushing of the vibrator 201 at S2003 and then the count value of the oscillation signal of the magnetometric sensor 10 becomes lower than the count threshold $C_1$ at a time point $t_{rel}$ (see FIG. 22), the CPU 21 detects that the pushing of the vibrator 201 is released at S2006. The time point $t_{rel}$ can be referred to as the released time point $t_{rel}$.

By contrast, if the CPU 21 does not detect the releasing of the vibrator 201 from the pushed condition (S2006: NO) and then the second time period "Te" becomes the given time period threshold (S2005: NO), the CPU 21 detects that the agitator 205 may be abnormal because the vibrator 201 is not released even if the agitator 205 is being rotated (S2016). Therefore, the given time period threshold used for the determination at S2005 can be set based on the rotation cycle of the agitator 205. For example, one rotation time of the agitator 205 can be used as the given time period threshold at S2005. After S2016, the CPU 21 reports that the agitator 205 is abnormal to a user.

If the CPU 21 detects the releasing of the vibrator 201 from the pushed condition (S2006: YES), the CPU 21 determines whether the vibrator 201 vibrates with a sufficient level that can calculate the above described attenuation rate $\zeta$ (S2007). FIG. 23 illustrates an example profile used for detecting whether the vibrator 201 vibrates with a sufficient level for calculating the above described attenuation rate $\zeta$ at S2007. Specifically, FIG. 23 illustrates an example case that the vibrator 201 does not vibrate with the sufficient level, and thereby the attenuation rate $\zeta$ cannot be calculated.

As above described, the CPU 21 acquires the count values of the oscillation signal of the magnetometric sensor 10 continuously or periodically. For example, the CPU 21 acquires the count values of the oscillation signal of the magnetometric sensor 10 in a time period "TP" starting from the time point $t_3$ to the time point $t_4$ (see FIG. 23). The time point $t_3$ is set as a time point after a given time elapses from the time point "$t_{rel}$" when the releasing of the vibrator 201 is detected at S2006. Then, the CPU 21 determines whether the count values of the oscillation signal of the magnetometric sensor 10 in the time period TP are within a threshold range defined by a upper threshold Ch and a lower threshold Cw indicated in FIG. 23, in which the CPU 21 determines whether absolute values of the amplitudes of the count values become within a given threshold range (e.g., range of Ch and Cw) during a given time period (e.g., TP) that is started at a time point (e.g., $t_3$) after the vibrator 201 is being vibrated from the released time point $t_{rel}$.

If the count values in the time period "TP" defined by the time point $t_3$ and the time point $t_4$ become within the threshold range defined by the upper threshold Ch and the lower threshold Cw, the CPU 21 determines that the vibrator 201 does not vibrate sufficiently, and determines that the peaks for calculating the attenuation rate $\zeta$ cannot be acquired. By contrast, if at least one of the count values in the time period "TP" defined by the time point $t_3$ and the time point $t_4$ is outside the threshold range defined by the upper threshold Ch and the lower threshold Cw, the CPU 21 determines that the vibrator 201 vibrates sufficiently. The time period "TP" can be used as a convergence-checking time period.

The time point $t_3$, the time point $t_4$, and the time period "TP" are used as the time points and the time period for determining whether the vibration of the vibrator 201 is within the threshold range defined by the upper threshold Ch and the lower threshold Cw. For example, if the cycle of the vibration of the vibrator 201 is set as "Tv" obtained empirically, the time point $t_3$ can be set as a time point when a time period "Tv" comes after the released time point $t_{rel}$. Further, the time point $t_4$ can be set as a time point when the time of three times of "Tv" elapses after the released time point $t_{rel}$.

In this case, the time period "TP" defined by the time point $t_3$ and the time point $t_4$ becomes a time period of two times of "Tv." However, this is just one example. The time period "TP" can be set any values to check whether the vibration of the vibrator 201 converges within a shorter time period. Specifically, when the vibrator 201 starts the vibration and then converges the vibration within the shorter time period that is too short to calculate the attenuation rate $\zeta$, the calculation of the attenuation rate $\zeta$ cannot be performed.

If the CPU 21 determines that the vibrator 201 vibrates with the sufficient level that can calculate the attenuation rate $\zeta$ (S2007: YES), the CPU 21 acquires the count values of the oscillation signal of the magnetometric sensor 10 continuously or periodically, and acquires the peak values of the count values matched to the vibration of the vibrator 201 as indicated in FIG. 19 (S2008). At S2008, the CPU 21 analyzes the count values acquired continuously or periodically at the counting time points to identify the peak values.

FIG. 24 is an example of a table used for analyzing the count values acquired at each of the counting time points continuously or periodically. The table includes the number "n" and the count value "Sn" at each number "n," and the plus or minus sign of a difference of "$S_{n-1}-S_n$" that is a difference of one count value "$S_n$" and another count value "$S_{n-1}$" right before the one count value "$S_n$" in the order of acquisition of the count values. In an example result of FIG. 24, a peak value can be determined when the plus or minus sign of "$S_{n-1}-S_n$" is changed from the plus to the minus or from the minus to the plus, in which the peak value can be identified as the count value "$S_{n-1}$." In an example result of FIG. 24, the count value "S5" at the number "5" and the count value "S10" at the number "10" can be used as the peak values.

When the CPU 21 determines that the vibrator 201 is released at S2006, at S2007, the CPU 21 calculates the difference of "$S_{n-1}-S_n$" for the sequentially acquired count values as indicated in FIG. 24. Then, the count value "$S_n$" that the plus or minus sign is changed can be used as the peak values such as $P_1$, $P_2$, $P_3$ and so on as indicated in FIG. 19.

As above described, it is preferred not to use the peak at time point $t_2$. Since the time point $t_2$ is already over when the CPU 21 determines that the vibrator 201 is released at S2006, the peak value at time point $t_2$ can be avoided for use.

Further, actual count values may include high frequency component noises, in which the plus or minus sign of "$S_{n-1}-S_n$" may be changed at a time point not corresponding to the peak value of the vibration of the vibrator 201. To prevent such error detection, the CPU 21 performs the smoothing processing to the count values acquired from the count value output unit 33, and then analyzes the count values as indicated in FIG. 24. The smoothing processing can use the moving-average method.

When the peak values are acquired as above described, the CPU 21 calculates the attenuation rate $\zeta$ using, for example, the formula (2) (S2009). Therefore, at S2008, until the peak values that can be used for the calculation of the attenuation rate are acquired, the count values are analyzed as indicated in FIG. 24. When the formula (2) is used, the CPU 21 analyzes the count values until the peak value $P_6$ is acquired.

When the CPU 21 calculates the attenuation rate $\zeta s$ above described, the CPU 21 determines whether the calculated attenuation rate $\zeta$ becomes a given threshold or less (S2010). When the toner remains inside the sub-hopper 200 with a sufficient quantity as illustrated in FIG. 18, the vibration of the vibrator 201 attenuates faster, and thereby the attenuation rate $\zeta$ calculated by using the formula (2) becomes smaller. By contrast, when the toner quantity inside the sub-hopper 200 decreases, the attenuation of the vibration of the vibrator 201 becomes slower, and the attenuation rate $\zeta$ calculated by the using formula (2) becomes greater.

Therefore, a target attenuation rate $\zeta s$ corresponding to a to-be-detected residual quantity of toner can be set as a given threshold at step S2010. By comparing the target attenuation rate $\zeta s$ and the attenuation rate $\zeta$ calculated by using the formula (2), it can determine that the residual quantity of toner in the sub-hopper 200 decreases to the target level that is required to be detected (hereinafter, "criteria quantity"). Therefore, the CPU 21 can determine that the residual quantity of toner in the sub-hopper 200 becomes less than the criteria quantity based on the ratio of the count values acquired at the different time points and the magnitude relationship of the calculated attenuation rate and the target attenuation rate.

If the attenuation rate $\zeta$ calculated by using the formula (2) is less than the given threshold such as the target attenuation rate $\zeta s$ (S2010: NO), the CPU 21 determines that the sufficient quantity of toner is retained in the sub-hopper 200, and the sequence ends. By contrast, if the attenuation rate $\zeta$ calculated by using the formula (2) becomes the given threshold such as the target attenuation rate $\zeta s$ or more (S2010: YES), the CPU 21 determines that the residual quantity of toner in the sub-hopper 200 becomes less than the criteria quantity, and the CPU 21 detects the toner quantity-reduced condition (S2011), and the sequence ends.

When the CPU 21 detects the toner quantity-reduced condition at S2011, the CPU 21 outputs a signal indicating that the residual quantity of toner becomes less than the criteria quantity to the main controller of the image forming apparatus 100. Then, the main controller of the image forming apparatus 100 can detect the toner quantity-reduced condition for a specific color, and instructs the toner bottle 117 to supply toner of the specific color.

At S2007, if the CPU 21 determines that the vibrator 201 does not vibrate with the sufficient level that can calculate the attenuation rate $\zeta$ (S2007: NO), as above described, it can be assumed that the sufficient quantity of toner is filled in the sub-hopper 200 and thereby the vibration of the vibrator 201 is obstructed strongly. In this case, the CPU 21 determines that the sufficient quantity of toner is filled in the sub-hopper 200 similar to a case that the attenuation rate $\zeta$ becomes less than the threshold at S2010.

By contrast, another case can be assumed that even if the toner quantity is almost empty in the sub-hopper 200, the vibration of the vibrator 201 is obstructed strongly due to sticking of toner on the vibrator 201 and thereby the vibrator 201 vibrates little. In this case, the alert notice requesting the toner supply is required to be issued. However, since the attenuation rate cannot be calculated, the toner quantity-reduced condition cannot be detected. The CPU 21 can perform the processing in view of this situation.

Specifically, if the CPU 21 determines that the vibrator 201 does not vibrate at S2007, and it can be assumed that toner is sticking on the vibrator 201, the CPU 21 instructs the agitator 205 to rotate so that the toner sticked on the vibrator 201 is removed from the vibrator 201 by rotating the agitator 205 (S2012). Then, the CPU 21 increments a count number of a no-vibration-detection counter for one (S2013). The no-vibration-detection counter is incremented when the CPU 21 determines that the vibration of the vibrator 201 does not occur. The CPU 21 may include the no-vibration-detection counter.

The no-vibration-detection counter incremented at 52013 can be cleared at S2013a when the CPU 21 determines that the vibration of the vibrator 201 occurs at S2007, which means S2013a is set before S2008. Therefore, the count value of the no-vibration-detection counter indicates the number of times that the CPU 21 determines that the vibration of the vibrator 201 does not occur continuously at S2007.

The count value of the no-vibration-detection counter also indicates the number of times that the agitator 205 is rotated at S2012. if the determination at step S2007 is performed for a plurality of times, it means that toner is supplied from the sub-hopper 200 for a plurality of times and the quantity of toner in the sub-hopper 200 is reduced, and thereby the possibility that the CPU 21 determines that the vibration of the vibrator 201 does not occur due to the tightly-filled toner condition becomes lower. Therefore, if the count value of the no-vibration-detection counter becomes a given threshold or more, it may mean that the vibrator 201 does not vibrate even if the agitator 205 performs the agitation for a plurality of times, in which the toner sticking that cannot be removed by the rotating the agitator 205 may occur with a higher probability.

If the count value of the no-vibration-detection counter is less than a given count threshold, which is a pre-set value (S2014: NO), the CPU 21 maintains the determination that the sufficient quantity of toner is filled in the sub-hopper 200, and the sequence ends. By contrast, if the count value of the no-vibration-detection counter becomes the given count threshold (S2014: YES), the CPU 21 detects that abnormality such as the toner sticking on the vibrator 201 may occur (S2015), and the sequence ends. The detection of the residual quantity of toner can be performed as above described.

As above described, as to the detection of the residual quantity of toner, the effect of toner to the vibration of the vibrator 201 can be detected. Since the residual quantity of toner can be detected by detecting the vibration of the vibrator 201, the residual quantity of toner in the casing 200c can be detected with a higher precision without using a pressure sensor that directly detects the toner pressure that is difficult to enhance the detection precision.

As to the detection of the residual quantity of toner, after the vibrator 201 is flipped by the agitator 205 and the vibrator 201 starts to vibrate, the CPU 21 determines whether the vibrator 201 vibrates with the sufficient level that can calculate the attenuation rate $\zeta$, and determines the residual quantity of toner in the sub-hopper 200 based on the calculated attenuation rate $\zeta$. Therefore, even if the vibrator 201 does not vibrate sufficiently and the attenuation rate $\zeta$ cannot be calculated due to the toner filling condition in the sub-hopper 200, the toner filling condition in the sub-hopper 200 can be determined as above described.

As to the above described example embodiment, the vibrator 201 is made of a metal plate detectable by using the magnetometric sensor 10, but not limited hereto. The vibrator 201 can be made of any material that can vibrate with a given number of vibrations, can effect the magnetic flux generated by the magnetometric sensor 10 depending on the change of the distance between the vibrator 201 and the magnetometric sensor 10, and can effect the oscillation signal frequency of the magnetometric sensor 10.

As to the above described example embodiment, the vibrator 201 is made of metal material that decreases the inductance L when the vibrator 201 becomes closer to the magnetometric sensor 10 by cancelling or offsetting the magnetic flux, but not limited hereto. For example, the vibrator 201 can be made of ferromagnetic material that can increase the inductance L when the vibrator 201 becomes closer to the magnetometric sensor 10 by increasing the magnetic flux.

As to the above described example embodiment, the vibrator 201 is made as a plate in view of eigenfrequency of the vibrator 201 and the effect of the vibrator 201 to the magnetic flux generated by the planar pattern coil 11 of the magnetometric sensor 10, but not limited hereto. For example, the vibrator 201 can be made as a rod if the rod can vibrate and effect the magnetic flux.

Further, as to the above described example embodiment, the mechanism or system that detects the residual quantity of toner in the sub-hopper 200 (FIG. 2) employs the configuration having the magnetometric sensor 10 and the vibrator 201, but not limited hereto. The above described configuration can be used to detect toner quantity, which is an example of powder, in another apparatus. For example, the above described configuration can be used to the residual quantity of toner in the developing device 112.

Further, as to the above described example embodiment, the detection target powder employs toner, which is the developer used for the image forming apparatus 100 of electrophotography, but not limited hereto. The detection target powder can be any powders having flowability or fluidity that can effect the vibration of the vibrator 201 depending on the residual quantity of powders. For example, a pre-mix agent that pre-mixes toner and carrier can be used. Further, the detection target powder is not limited to the developer used for the image forming apparatus 100, but other powders having flowability or fluidity that can effect the vibration of the vibrator 201 depending on the residual quantity of powders can be used. Further, the detection target can use any liquid having flowability or fluidity that can effect the vibration of the vibrator 201 depending on the residual quantity of liquid.

Further, as to the above described example embodiment, the attenuation rate $\zeta$ is calculated by using the formula (2), but not limited hereto. For example, the attenuation rate $\zeta$ can be calculated as an average value of a plurality of peaks as indicated by the formula (3).

$$\zeta = \frac{1}{2}\left(\frac{P_4 - P_3}{P_2 - P_1} + \frac{P_8 - P_7}{P_6 - P_5}\right) \quad (3)$$

Further, the attenuation rate $\zeta$ can be calculated as a ratio of the peak values as indicated by the formula (4).

$$\zeta = \frac{P_6}{P_2} \quad (4)$$

Further, as to the above described example embodiment, the planar pattern coil is patterned and formed on the board. By forming the coil on a flat face, the thickness of the magnetometric sensor 10 facing the vibrator 201 (i.e., detection target) can be set thinner, with which the apparatus can be compact in size.

However, the coil is not limited to the planar pattern. The coil can be formed of any patterns as long as the magnetic flux is generated in a direction perpendicular to a face of the vibrator 201. FIGS. 25 and 26 illustrates another example configuration of the coil. FIG. 25 illustrates a magnetometric sensor 10a having a board formed with the coil viewed from a side of the magnetometric sensor 10a, and FIG. 26 illustrates the magnetometric sensor 10 of FIG. 25 viewed from a top side of the magnetometric sensor 10a.

In an example configuration of FIGS. 25 and 26, a coil 11a is formed on the board of the magnetometric sensor 10a, in which the coil 11a is formed by winding surface-insulated wire. As to the example of FIGS. 25 and 26, the thickness of the magnetometric sensor 10a facing the vibrator 201 (i.e., detection target) can be set thinner as illustrated in FIG. 25, with which the apparatus can be compact in size.

Figure 27:
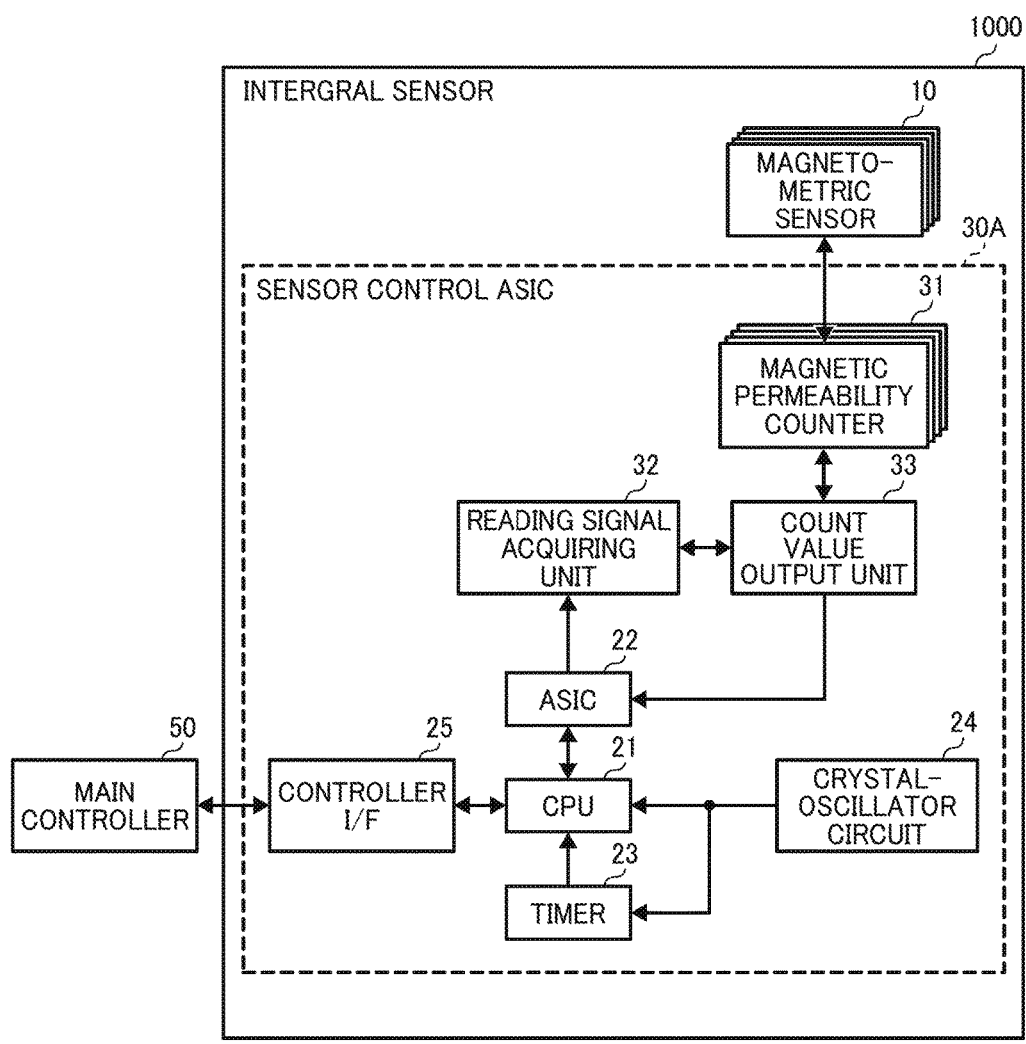
FIG. 27 illustrates a block diagram of an another integral sensor of one example embodiment of the present invention.

Further, as to the above described example embodiment, as illustrated in FIG. 8, the magnetometric sensor 10 outputs the oscillation signal, and the main controller that controls the image forming apparatus 100 acquires the oscillation signal, and performs various processing such as the detection process and the determination process. Further, as illustrated in FIG. 27, another configuration can be devised. For example, an integral sensor 1000 having an information processing capability that can perform the determination process, and the magnetometric sensor 10 can be configured as an integral unit and attached on the casing similar to the magnetometric sensor 10 of FIG. 3, and can be coupled to a main controller 50 of the image forming apparatus 100, in which the main controller 50 acquires the determination result from the integral sensor 1000.

FIG. 27 is a block diagram of the integral sensor 1000 indicating each of internal units, and a coupling or connection with the main controller 50. As illustrated in FIG. 27, the integral sensor 1000 includes, for example, a sensor control ASIC 30A and the above described magnetometric sensor 10. The sensor control ASIC 30A includes the units included in the input-output control ASIC 30 and the controller 20 of FIG. 8.

The sensor control ASIC 30A includes, for example, the magnetic permeability counter 31, the reading signal acquiring unit 32, the count value output unit 33, the CPU 21, the ASIC 22, the timer 23, the crystal-oscillator circuit 24 and a controller interface (I/F 25). Except the controller I/F25, the configuration of FIG. 27 are same as the configuration of FIG. 8.

The controller I/F 25 is used as an interface for information communication between the CPU 21 and the main controller 50. In this configuration, the process of FIG. 20 is performed by the sensor control ASIC 30A, and the determination result of the process is transmitted from the sensor control ASIC 30A to the main controller 50 via the controller I/F25.

Further, as to the above described example embodiment, the CPU 21 determines whether the vibrator 201 vibrates with the sufficient level that can calculate the attenuation rate $\zeta$ using the determination configuration illustrated in FIG. 23. In this case, after detecting the release of the vibrator 201, the CPU 21 determines whether the amplitude of vibration of the vibrator 201 during a given time period becomes within the threshold range defined by the upper threshold Ch and the lower threshold Cw. As to the determination configuration illustrated in FIG. 23, the CPU 21 detects whether the vibration of the vibrator 201 converges with the given time period, and determine whether the given time period is shorter or longer. For example, the given time period can be defined by the time period "TP" from the time point $t_3$ to the time point $t_4$ as indicated in FIG. 23, and the length of the time period "TP" can be used to determine whether the time period "TP" is shorter or longer.

Further, another determination configuration can be devised so that the CPU 21 can determine the convergence of vibration real time, in which the CPU 21 acquires a time period used for determining the convergence of vibration, and compares the time period used for determining the convergence of vibration with a given threshold. If the time period is smaller than the given threshold, the CPU 21 determines that the vibrator 201 vibrates little so that the attenuation rate $\zeta$ cannot be calculated, and if the time period is greater than the given threshold, the CPU 21 determines that the vibrator 201 vibrates with the sufficient level that can calculate the attenuation rate $\zeta$. A description is given of another determination configuration with reference to FIGS. 28.

Figure 28:
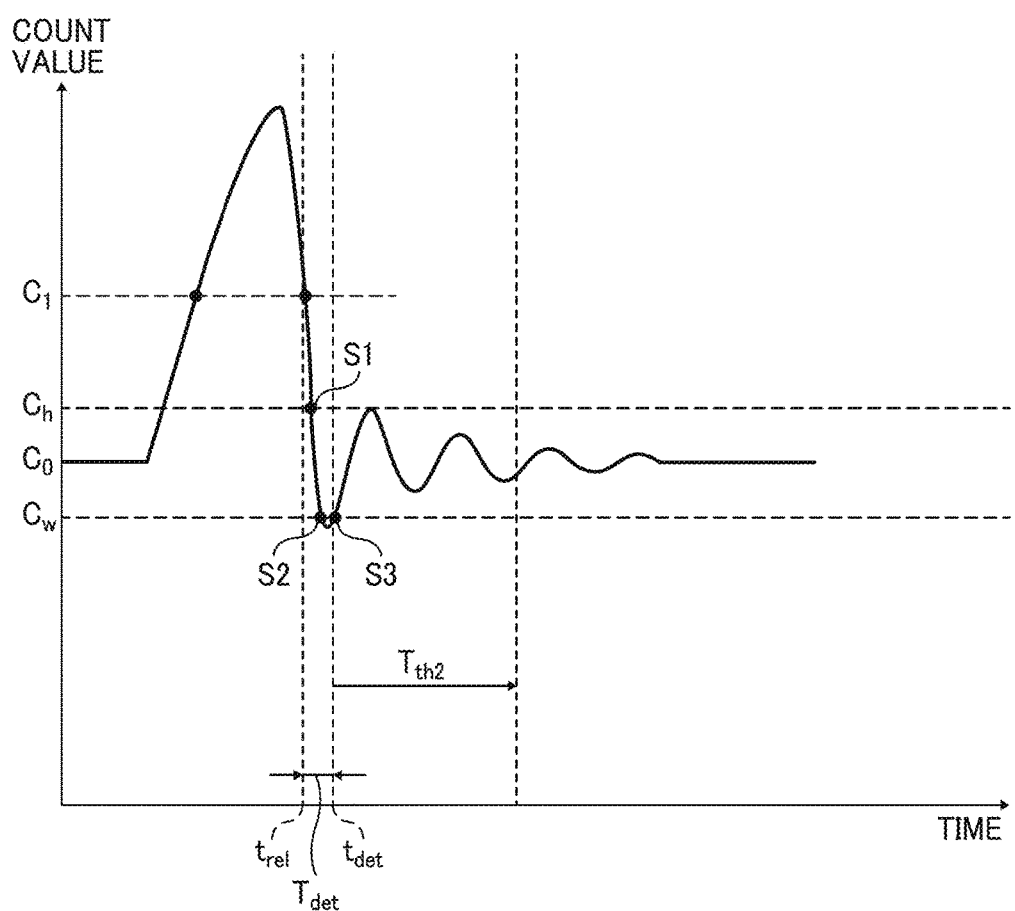
FIG. 28 illustrates a change of count values related to oscillation signal of the magnetometric sensor when the vibration of the vibrator is obstructed of another example embodiment of the present invention.

As illustrated in FIG. 28, when the CPU 21 sequentially acquires the count values of the oscillation signal of the magnetometric sensor 10, the CPU 21 determines whether the count values are within the threshold range defined by the upper threshold Ch and the lower threshold Cw. Then, when the count value becomes within the threshold range defined by the upper threshold Ch and the lower threshold Cw at one time point, the one time point is set as a time point $t_{det}$ temporally, and the CPU 21 starts to count the time period.

For example, as indicated in FIG. 28, when the count value becomes the upper threshold Ch for the first time after the release of the vibrator 201 at one time point (see "S1" in FIG. 28), the one time point is set as the start time point $t_{det}$ temporally. However, when the count value becomes a value outside the threshold range defined by the upper threshold Ch and the lower threshold Cw at another time point (see "S2" in FIG. 28), the set start time point $t_{det}$ is cancelled. Then, when the count value becomes the lower threshold Cw at a further another time point (see "S3" in FIG. 28), the further another time point is set as the start time point $t_{det}$ temporally, and the CPU 21 continues to count a time period after the further another time point set as the start time point $t_{det}$. If the count value becomes a value outside the threshold range defined by the upper threshold Ch and the lower threshold Cw, the CPU 21 cancels the set time point $t_{det}$ and resets the counting of the time period. In the example of FIG. 28, the count values of the oscillation signal of the magnetometric sensor 10 are being within the threshold range defined by the upper threshold Ch and the lower threshold Cw after the further another time point set as the start time point $t_{det}$.

When the time period count becomes a time threshold $T_{th2}$ while continuously detecting the count values of the oscillation signal of the magnetometric sensor 10 are within the threshold range defined by the upper threshold Ch and the lower threshold Cw as indicated in FIG. 28, the CPU 21 retrospectively determines that the previously set start time point "$t_{det}$" (see"S3" in FIG. 28) is the start time point that the vibration of the vibrator 201 starts to converge within the threshold range defined by the upper threshold Ch and the lower threshold Cw. Then, the CPU 21 calculates a criteria time period "Tdet" from the time point "$t_{rel}$" to the start time point "$t_{det}$" (see"S3" in FIG. 28), and then the CPU 21 determines whether the criteria time period "Tdet" is shorter than a given threshold.

If the CPU 21 determines that the criteria time period "Tdet" is shorter than the given threshold, the CPU 21 determines that the vibration of the vibrator 201 converges within a short time period that the calculation of the attenuation rate ζ is difficult to perform, and determines that the vibration of the vibrator 201 does not occur at S2007 (FIG. 20). The time threshold $T_{th2}$ is used as a time period to determine whether the vibration of the vibrator 201 converges within the threshold range defined by the upper threshold Ch and the lower threshold Cw, and the time threshold $T_{th2}$ is used similar to the time period "TP" defined by the time point "$t_3$" to the time point "$t_4$" of FIG. 23. Therefore, the threshold time threshold $T_{th2}$ can be set, for example, two times of "Tv" of the vibration of the vibrator 201 obtained empirically. The threshold time threshold $T_{th2}$ can be used as the convergence-checking time period.

Further, the given threshold compared with the criteria time period "Tdet" can be used as the period to determine whether the vibration of the vibrator 201 converges within the short time period that the calculation of the attenuation rate ζ is difficult to perform. Therefore, the criteria time period "Tdet" can be used same as the time period from the time point "$t_{rel}$" to the time point "$t_3$" of FIG. 23. Therefore, the given threshold compared with the criteria time period "Tdet" can be set as "Tv" of the vibration of the vibrator 201 obtained empirically.

Further, as to the above described example embodiment, the convergence of the vibration of the vibrator 201 is determined by using the threshold Cw and the threshold Ch as illustrated in FIGS. 23 and 28, but not limited hereto. For example, the CPU 21 can calculate a change of the count values of the oscillation signal of the magnetometric sensor 10 sequentially input real time, and when the change is maintained within a given threshold range for a given period or more, the CPU 21 can determine that the vibration of the vibrator 201 converges.

As to the above described example embodiments, the residual quantity of powder in the casing, which is the detection target having flowability or fluidity, can be detected with a higher precision, and the powder filling condition in the casing can be detected with a higher precision. The detection target can be powder and also liquid having flowability or fluidity. The powder may be toner in the developing device used for electrophotography.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be merged each other and/or substituted for each other within the scope of this disclosure and appended claims.

Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Since the present invention can be implemented as software, each and every aspect of the present invention thus encompasses computer software implementable on a programmable device. The computer software can be provided to the programmable device using any conventional storage medium storing the computer software or can be transmitted to the programmable device from another device via the network. For example, the computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), Blu-ray disc, electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

What is claimed is:

1. A fluid detection apparatus to detect a quantity of a fluid having flowability and stored in a casing, the fluid detection apparatus comprising:
   an oscillator disposed outside the casing to output a frequency of an oscillation signal corresponding to a magnetic flux passing through a space near the oscillator;
   a vibrator made of material effecting the magnetic flux and disposed inside the casing, the vibrator facing the oscillator via a wall of the casing;
   a vibration trigger disposed inside the casing to vibrate the vibrator; and
   circuitry to:
      acquire frequency-related information related to the frequency of the oscillation signal output from the oscillator periodically, the frequency-related information changeable depending on a vibration of the vibrator;
      detect the vibration of the vibrator based on a change of the frequency-related information;
      determine whether the vibration of the vibrator converges during a convergence-checking time period defined by two time points set after the vibrator is vibrated by the vibration trigger; and
      detect the quantity of the fluid in the casing based on a convergence determination result of the vibration of the vibrator, wherein when the circuitry determines that the vibration of the vibrator converges within a given range during the convergence-checking time period defined by the two time points set after the vibrator is vibrated by the vibration trigger, the circuitry determines that the quantity of fluid filled in the casing is a predetermined quantity or more, the circuitry acquires values corresponding to the frequency of the oscillation signal of the oscillator as the frequency-related information periodically, and the circuitry sets a released time point of the vibrator when the vibrator is released from the vibration trigger and starts to vibrate, when one of the values corresponding to the frequency of the oscillation signal of the oscillator at one time point after the released time point is within the given range after the vibrator starts to vibrate, the circuitry detects the one time point as a start time point for detecting convergence of the vibration of the vibrator, when another one of the values corresponding to the frequency of the oscillation signal of the oscillator becomes outside the given range after the vibrator starts to vibrate and then the start time point is set, the circuitry cancels the set start time point, when a time period counted from the start time point becomes a given time threshold while the values corresponding to the frequency of the oscillation signal of the oscillator are being within the given range, the circuitry determines that the vibration of the vibrator starts to converge at the start time point retrospectively, the circuitry determines a criteria time period defined by the released time point and the start time point, and compares the criteria time period and a given threshold, and the circuitry determines that the vibration of the vibrator converges faster if the criteria time period is smaller than the given threshold.

2. The fluid detection apparatus of claim 1, wherein the circuitry acquires a value corresponding to the frequency of the oscillation signal of the oscillator as the frequency-related information periodically, wherein when a value corresponding to the frequency of the oscillation signal of the oscillator converges within the given range during the convergence-checking time period defined by the two time points set after the vibrator is vibrated by the vibration trigger, the circuitry determines that the vibration of the vibrator converges.

3. A fluid detection apparatus to detect a quantity of a fluid having flowability and stored in a casing, the fluid detection apparatus comprising:

an oscillator disposed outside the casing to output a frequency of an oscillation signal corresponding to a magnetic flux passing through a space near the oscillator;

a vibrator made of material effecting the magnetic flux and disposed inside the casing, the vibrator facing the oscillator via a wall of the casing;

a vibration trigger disposed inside the casing to vibrate the vibrator; and circuitry to:
acquire frequency-related information related to the frequency of the oscillation signal output from the oscillator periodically, the frequency-related information changeable depending on a vibration of the vibrator;

detect the vibration of the vibrator based on a change of the frequency-related information;

determine whether the vibration of the vibrator converges during a convergence-checking time period defined by two time points set after the vibrator is vibrated by the vibration trigger; and detect the quantity of the fluid in the casing based on a convergence determination result of the vibration of the vibrator, wherein when the circuitry determines that the vibration of the vibrator converges within a given range during the convergence-checking time period defined by the two time points set after the vibrator is vibrated by the vibration trigger, the circuitry determines that the quantity of fluid filled in the casing is a predetermined quantity or more, when the circuitry determines that the vibration of the vibrator converges within the given range at a given time point after the vibrator is vibrated by the vibration trigger, the circuitry increments a count number of a no-vibration-detection counter by one, when the circuitry determines that the vibrator is vibrating at the given time point after the vibrator is vibrated by the vibration trigger, the circuitry resets the count number of the no-vibration-detection counter to zero, and when the incremented count number of the no-vibration-detection counter becomes a threshold value, the circuitry determines that an abnormality occurs to the fluid in the casing.

4. The fluid detection apparatus of claim 1, wherein the vibration trigger is an agitator that agitates the fluid in the casing, wherein when the circuitry determines that the vibration of the vibrator converges within the given range after a given time period elapses after the vibrator is vibrated by the agitator, the circuitry drives the agitator to agitate the fluid in the casing.

5. A fluid detection apparatus to detect a quantity of a fluid having flowability and stored in a casing, the fluid detection apparatus comprising:

an oscillator disposed outside the casing to output a frequency of an oscillation signal corresponding to a magnetic flux passing through a space near the oscillator;

a vibrator made of material effecting the magnetic flux and disposed inside the casing, the vibrator facing the oscillator via a wall of the casing;

a vibration trigger disposed inside the casing to vibrate the vibrator; and circuitry to:
acquire frequency-related information related to the frequency of the oscillation signal output from the oscillator periodically, the frequency-related information changeable depending on a vibration of the vibrator;

detect the vibration of the vibrator based on a change of the frequency-related information;

determine whether the vibration of the vibrator converges during a convergence-checking time period defined by two time points set after the vibrator is vibrated by the vibration trigger; and detect the quantity of the fluid in the casing based on a convergence determination result of the vibration of the vibrator, wherein when the vibration trigger pushes and then leaves from the vibrator to vibrate the vibrator, the circuitry checks the frequency-related information to detect that the vibrator is pushed by the vibration trigger, and when the circuitry does not detect that the vibrator is pushed after the vibration trigger is driven for a given time period or more, the circuitry determines that an abnormality occurs to the fluid detection apparatus.

6. The fluid detection apparatus of claim 5, wherein the circuitry checks the frequency-related information to detect that the vibrator pushed by the vibration trigger is released from the vibration trigger, and wherein when the circuitry detects that the vibrator is pushed, but the circuitry does not detect that the vibrator is released for a given time period or more, the circuitry determines that the abnormality occurs to the fluid detection apparatus.

7. The fluid detection apparatus of claim 1, wherein the fluid is a developer used for an image forming apparatus, and the fluid detection apparatus detects a quantity of the developer in the casing.

8. The fluid detection apparatus of claim 3, wherein the vibration trigger is an agitator that agitates the fluid in the casing, wherein when the circuitry determines that the vibration of the vibrator converges within the given range after a given time period elapses after the vibrator is vibrated by the agitator, the circuitry drives the agitator to agitate the fluid in the casing.

9. The fluid detection apparatus of claim 3, wherein the fluid is a developer used for an image forming apparatus, and the fluid detection apparatus detects a quantity of the developer in the casing.

10. The fluid detection apparatus of claim 5, wherein the vibration trigger is an agitator that agitates the fluid in the casing, wherein when the circuitry determines that the vibration of the vibrator converges within the given range after a given time period elapses after the vibrator is vibrated by the agitator, the circuitry drives the agitator to agitate the fluid in the casing.

11. The fluid detection apparatus of claim 5, wherein the fluid is a developer used for an image forming apparatus, and the fluid detection apparatus detects a quantity of the developer in the casing.

* * * * *